(12) United States Patent
Shin et al.

(10) Patent No.: US 11,217,017 B2
(45) Date of Patent: Jan. 4, 2022

(54) METHODS FOR PROCESSING 3D DATA FOR USE IN WEB SERVICES

(71) Applicant: GAIA3D, Inc., Seoul (KR)

(72) Inventors: Sang Hee Shin, Seoul (KR); Seong Do Son, Seoul (KR); Hak Jun Kim, Seoul (KR)

(73) Assignee: GAIA3D, Inc., Seoul (KR)

(*) Notice: Subject to any disclaimer, the term of this patent is extended or adjusted under 35 U.S.C. 154(b) by 69 days.

(21) Appl. No.: 16/700,419

(22) Filed: Dec. 2, 2019

(65) Prior Publication Data

US 2020/0105058 A1    Apr. 2, 2020

Related U.S. Application Data

(63) Continuation of application No. 16/618,560, filed as application No. PCT/KR2018/003004 on Mar. 14, 2018.

(30) Foreign Application Priority Data

Jan. 30, 2018  (KR) .................. 10-2018-0011368
Feb. 13, 2018  (KR) .................. 10-2018-0017780

(51) Int. Cl.
*G06T 17/20*    (2006.01)
*G06T 15/06*    (2011.01)
(Continued)

(52) U.S. Cl.
CPC ............ *G06T 17/205* (2013.01); *G06T 15/06* (2013.01); *H04L 67/02* (2013.01); *H04L 67/42* (2013.01)

(58) Field of Classification Search
CPC ........ G06T 15/06; G06T 17/20; G06T 17/205
See application file for complete search history.

(56) References Cited

U.S. PATENT DOCUMENTS 5,123,084 A    6/1992  Prevost et al.
5,448,686 A *  9/1995  Borrel .................. G06T 17/005
                                                    345/420
(Continued)

FOREIGN PATENT DOCUMENTS

KR    10-2010-0013059 A    2/2010
KR    10-1465483 B1    11/2014
KR    10-1756802 B1    7/2017

OTHER PUBLICATIONS

Office Action from corresponding U.S. Appl. No. 16/618,560, dated Dec. 22, 2020.
(Continued)

*Primary Examiner* — King Y Poon
*Assistant Examiner* — Vincent Peren
(74) *Attorney, Agent, or Firm* — Harness, Dickey & Pierce, P.L.C.

(57) ABSTRACT

Disclosed is a method for providing 3D GIS (Geographic Information System) web services using a web client and a server, the method including the steps of with the server, processing information to be transmitted to the web client, and with the server, transmitting, to the web client, information to be displayed on a screen of the web client in response to a request from the web client, wherein the information in the step of processing information includes information about a 3D object containing an internal object, the information about a 3D object having one or more first sub-cubes and one or more second sub-cubes set for the 3D object, with the first sub-cubes being used for processing visibility indexes and the second sub-cubes being used for processing spatial indexes, and wherein the step of transmitting information includes transmitting information about an internal object that corresponds to a visibility index overlapped with a spatial index.

4 Claims, 42 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 6,259,452 | B1 | 7/2001 | Coorg et al. |
| 6,278,457 | B1* | 8/2001 | Bernardini ............. G06T 17/20 345/420 |
| 6,580,425 | B1* | 6/2003 | Zwicker ................. G06T 15/04 345/420 |
| 2003/0046617 | A1* | 3/2003 | MacPherson .......... G06T 17/20 714/48 |
| 2003/0112239 | A1* | 6/2003 | Shin ....................... G06T 17/20 345/428 |
| 2009/0109219 | A1* | 4/2009 | DeCoro ................. G06T 17/20 345/423 |
| 2010/0277476 | A1* | 11/2010 | Johansson .............. G06T 17/20 345/423 |
| 2010/0306200 | A1 | 12/2010 | Frank et al. |
| 2013/0187915 | A1* | 7/2013 | Lee ........................ G06T 9/001 345/420 |
| 2013/0321593 | A1 | 12/2013 | Kirk et al. |
| 2014/0228115 | A1 | 8/2014 | Kaplan |
| 2017/0169608 | A1* | 6/2017 | Starhill .................. G06T 15/04 |

OTHER PUBLICATIONS

International Search Report from corresponding PCT Application No. PCT/KR2018/003004, dated Oct. 22, 2018.
Shin, Sang Hee; Web-based BIM/AEC/3D GIS Integration Visualization Platform, SlideShare, Oct. 16, 2017, retrieved from the Internet: <URL: http://slideshare.net/endofcap/mago3d>.
Shin, Sang Hee, et al.; "Let's Integrate BIM and 3D GIS on top of FOSS4G!", FOSS4G—Europe 2017, Jul. 19, 2017, pp. 1-84.
Shin, Sang Hee, et al.; "A Brand New Geo-BIM Platform on top of Cesium & World Wind" FOSS4G Boston 2017, Aug. 17, 2017, pp. 1-51.
Shin, Sang Hee, et al.; "Let's Integrate BIM/AEC and 3D GIS on top of FOSS4G", Sep. 15, 2017, pp. 1-52.
Shin, Sang Hee, et al.; "Mago3D, Innovation with 3D by adding Z-axis in your browser", FOSS4G, Oct. 14, 2017, pp. 1-42.
Shin, Sang Hee, et al.; "A web based BIM/GIS integration platform on top of open source.", Nov. 24, 2017, pp. 1-55.
Kim, Hak Jun; "Let's Integrate BIM/AEC and 3D GIS on Your Web Browser!", Plant Chosun Conference 2018, Jan. 19, 2018, pp. 1-34.

* cited by examiner $$C_{ijk}$$

| Surface direction | IDs of visible internal objects |
|---|---|
| North | 1034, 1035, 1036, ...... |
| East | 2100, 2101, 1989, ...... |
| South | 103, 105, 107, ...... |
| West | 876, 924, 989, ...... |
| Top | - |
| bottom | 545, 555 |

FIG. 8

| First sub-cubes | IDs of internal objects visible from corresponding first sub-cube |
|---|---|
| ... | ... |
| $C_{i,j,k}$ | 545, 1035, 1036, ... |
| $C_{i+1,j,k}$ | 1033, 1034, 1037, ... |
| $C_{i+2,j,k}$ | 1037, 1038, 1039, ... |
| ... | ... |

FIG. 9

| Second sub-cubes | IDs of internal objects visible from corresponding second sub-cube |
|---|---|
| ... | ... |
| $O_{x,y,z}$ | 554, 555, 558, ... |
| $O_{x+1,y,z}$ | 605, 608, 612, ... |
| $O_{x+2,y,z}$ | 1011, 1020, 1025, ... |
| ... | ... |

FIG. 11

| Second sub-cubes | Spatial indexes of corresponding second sub-cubes | Visibility indexes of first sub-cubes that are overlapped with spatial indexes of corresponding second sub-cubes | |
|---|---|---|---|
| ... | ... | ... | |
| $O_{x,y,z}$ | 554, 555, 558, ... | ... | ... |
| | | $C_{i,j,k}$ | 554, 558, ... |
| | | $C_{i+1,j,k}$ | 554, 555, 558, ... |
| | | $C_{i+2,j,k}$ | 558, ... |
| | | ... | ... |
| $O_{x+1,y,z}$ | 605, 608, 612, ... | ... | ... |
| | | $C_{i,j,k}$ | none |
| | | $C_{i+1,j,k}$ | none |
| | | $C_{i+2,j,k}$ | 605, 612 |
| | | ... | ... |
| $O_{x+2,y,z}$ | 1011, 1020, 1025, ... | ... | ... |
| | | $C_{i,j,k}$ | 1011, ... |
| | | $C_{i+1,j,k}$ | 1011, 1020, 1025, ... |
| | | $C_{i+2,j,k}$ | 1020, 1025, ... |
| | | ... | ... |
| ... | ... | ... | |

FIG. 14

METHODS FOR PROCESSING 3D DATA FOR USE IN WEB SERVICES

CROSS-REFERENCE TO RELATED APPLICATIONS

This application is a continuation of U.S. application Ser. No. 16/618,560, filed on Dec. 2, 2019, which is a national phase application of PCT Application No. PCT/KR2018/003004, filed on Mar. 14, 2018, which claims the benefit and priority to Korean Patent Application Nos. 10-2018-0011368, filed on Jan. 30, 2018 and 10-2018-0017780, filed on Feb. 13, 2018. The entire disclosures of the applications identified in this paragraph are incorporated herein by references.

FIELD

The present disclosure relates generally to a method for providing 3D GIS (Geographic Information System) web services, and in particular, to a method for providing 3D GIS web services with faster response.

Further, the present disclosure relates generally to a method for processing 3D data for web services and a system using the same. In particular, it relates to a method for processing 3D data for web services with faster response, and a system using the same.

BACKGROUND

This research was supported by a grant (number:19NSIP-B080778-06) from National Spatial Information Research Program (NSIP) funded by Ministry of Land, Infrastructure and Transport of Korean government.

This section provides background information related to the present disclosure which is not necessarily prior art.

GIS (Geographic Information System) refers to a system that handles geospatial data (e.g. Korean Patent Application Laid-Open No. 10-2010-0013059).

3D data visualization (3D rendering) in a 3D GIS web service certainly requires high-performance operations, and a thin client (web client) based on a web browser is used as a service client in the GIS web service. This implies that it would be very hard to handle 3D GIS data in the field of GIS web services because 3D GIS data handling usually involves modeling a large area such as high-rise buildings/streets/major facilities typically found in a big city or topography of the land, and almost all of the 3D GIS data is heavy and has a very large volume. Therefore, it is rather natural and logical to have the data server provide pre-optimized data to the service client if the service client requests the server for 3D GIS data, such that the service client is allowed to handle only minimum data that is absolutely necessary.

A number of techniques are available for use in the optimization of 3D GIS data provided to the service client, and culling 3D objects that are shown on the screen is another good approach as one of those techniques employed in other conventional fields of 3D rendering. Among others, occlusion culling, which is a feature that culls 3D objects located behind as they are obscured by other 3D objects located in front of them, is highly suitable for optimizing 3D GIS data. It would be very reasonable to assume that in GIS web services handling at least city-scale GIS data, much more 3D objects are likely to be removed by occlusion culling.

The field of video games will be the one where the majority of technologies have been developed and are currently being applied to improve the performance of 3D rendering. Needless to say, occlusion culling is often used in video games, and there are many different kinds of occlusion culling methods being designed. However, these occlusion culling methods for gaming are reported to cause problems to be used directly in 3D GIS web services. Those problems occur due to differences described below between a game program and a GIS service client.

Firstly, any video game performing heavy 3D rendering usually uses a high-performance thick client as its dedicated client (e.g. ".exe" or ".dll" files operated in a PC).

Secondly, even for an online game, most of heavy 3D object data should be installed at the time of installing the game. In doing so, a game client does not have to handle the data while communicating with the server during runtime.

Thirdly, as 3D space within the game is divided by scenes, the game client always performs 3D rendering on only a particular scene. If the scene changes, the game client releases resources allocated to the pre-existing scenes and reads data necessary for a next scene (i.e. zone loading). Game users are also familiar with this zone loading. That is, they use the occlusion culling method optimized within a certain defined space.

However, the occlusion culling method specialized for zone loading might not be a good option for use in the 3D GIS web service where the camera must continuously work among 3D modeled objects of an actual city or geography.

FIG. 1 and FIG. 2 illustrate a scene visualized without performing occlusion culling on GIS data and a scene visualized by performing occlusion culling, respectively.

For 3D GIS web services, occlusion culling is a useful way for improving the performance of a web client. Unfortunately though, as mentioned above, this is not sufficient enough to improve 3D web service performances. To this end, 3D geospatial data, or in particular, visibility indices for buildings in the 3D geospatial data may be prepared for use in occlusion culling, according to this disclosure.

With technical advances brought by Internet, many web services that provide 3D data in real-time have always drawn attention. For instance, GIS using 3D data is under active development. GIS web services using BIM (Building Information Modeling) and other web services for providing data on 3D drawings available from industries including architecture, and public or large-scale mechanical works are also under active development.

FIG. 3 shows an example of systems for processing 3D data (e.g. BIM data) for use in the GIS system as described in Korean Patent Laid-Open Publication No. 1465483. Some of numerals in drawings are changed for convenience of explanation.

In this BIM data processing system 10, a data collector 11 collects BIM data, and a data selector 12 selects triangular mesh data from the BIM data. A data converter 13 converts parametric data in the BIM data into triangular mesh data because the latter is more suitable for obtaining lightweight 3D data as 3D data in triangular meshes is transmitted and displayed on a user screen through a web service, and facilitates construction of 3D data of different LODs (Level of Detail) by an LOD generator 16. 3D data herein refers to any type of data, which stores 3D objects in digital signals, including, for example, BIM data, triangular mesh data, 3D drawing data, and so on.

FIGS. 4A to 4C describe relationships between different LODs and triangular mesh data.

LOD is the term determined by the degree or level of model detail. FIG. 4A shows triangular mesh models constructed from triangular mesh data and displayed on the user screen, in which each of the triangular mesh models is given an LOD. LODs decrease in the left-to-right direction. A lower LOD indicates a smaller number of triangles constructing a triangular mesh model displayed on the screen. That is, a triangular mesh model 20 on the very left side is constructed with 69,451 triangles, while a triangular mesh model 23 on the very right side is constructed with 76 triangles. If a triangular mesh model 20, 21, 22, or 23 has a smaller number of triangles for its construction, LOD for the triangular mesh model 20, 21, 22, or 23 displayed on the screen will be lower, and triangular mesh data size containing information about the triangular mesh model will be smaller accordingly. It is important to produce triangular mesh data that support multiple LODs because such triangular mesh data can be transmitted faster over the Internet and displayed faster on the user screen if the LOD of a triangular mesh model to be displayed on the user screen is maintained at an appropriate level. For example, when a triangular mesh model is zoomed in or seen in close-up on the screen as in FIG. 4B, it is necessary to use triangular mesh data that will generate a higher LOD triangular mesh model. However, when a triangular mesh model is zoomed out or seen smaller and farther away as in FIG. 4C, since more triangular mesh models are likely to be displayed on the screen, it is necessary to use triangular mesh data that will generate a lower LOD triangular mesh model. In this manner, both the web service system performance and the transfer rate will not be deteriorated. It is yet important that LOD should be lowered to a certain extent within limitation where human eyes are unable to discern any difference.

Accordingly, the present disclosure relates to a method for converting large-volume/high-precision 3D data into lightweight triangular mesh data for web services. Further, it relates to a method for adjusting LOD of such lightweight triangular mesh data that supports multiple LODs, and a system using the method.

SUMMARY

This section provides a general summary of the disclosure and is not a comprehensive disclosure of its full scope or all of its features.

According to one aspect of the present disclosure, there is provided a method for providing 3D GIS (Geographic Information System) web services using a web client and a server, the method comprising the steps of: with the server, processing information to be transmitted to the web client; and with the server, transmitting, to the web client, information to be displayed on a screen of the web client in response to a request from the web client, wherein the information in the step of processing information includes information about a 3D object containing an internal object, the information about a 3D object having one or more first sub-cubes and one or more second sub-cubes set for the 3D object, with the first sub-cubes being used for processing visibility indexes and the second sub-cubes being used for processing spatial indexes, and wherein the step of transmitting information includes transmitting information about an internal object that corresponds to a visibility indexes overlapped with a spatial index.

According to another aspect of the present disclosure, there is provided a method for processing 3D data for use in web services, the method comprising the steps of: receiving 3D data about a 3D object; making the 3D data about a 3D object into lightweight triangular mesh data; and adjusting LOD (Level of Detail) of a triangular mesh model created by the lightweight triangular mesh data, wherein the step of making the 3D data about a 3D object into lightweight triangular mesh data includes: creating a 3D object model using the received 3D data about the 3D object; projecting rays onto the created 3D object model to select intersections of the rays and surfaces of the 3D object model; and constructing a triangle mesh model using the intersections of the rays and surfaces of the 3D object model.

According to another aspect of the present disclosure, there is provided a method for processing 3D data for use in web services, the method comprising the steps of: receiving 3D data about a 3D object; making the 3D data about a 3D object into lightweight triangular mesh data; and adjusting LOD (Level of Detail) of a triangular mesh model created by the lightweight triangular mesh data, wherein the step of adjusting LOD of a triangular mesh model created by the lightweight triangular mesh data includes: dividing edges of each triangle forming the triangle mesh model into frontier edges and inner edges; collapsing one or more edges among the frontier and inner edges for each triangle forming the triangle mesh model; and determining whether a decrease in LOD due to the collapsed edges is within an acceptable range.

Objectives, advantages, and a preferred mode of making and using the claimed subject matter may be understood best by reference to the accompanying drawings in conjunction with the following detailed description of illustrative embodiments.

BRIEF DESCRIPTION OF THE DRAWINGS

FIGS. 6, 7, 8 and 9 illustrate examples of a method for defining a visibility index according to the present disclosure.

FIGS. 10 and 11 describe examples of a method for defining a spatial index according to the present disclosure.

FIGS. 13A, 13B, 13C, 13D and 14 describe a method for providing a web service utilizing predefined visibility indexes and spatial indexes, according to the present disclosure.

DETAILED DESCRIPTION

The present disclosure will now be described in detail with reference to the accompanying drawing(s). References to "upper"/"lower", "above"/"below" or others used herein for giving directions are with respect to the drawings.

Figure 5:
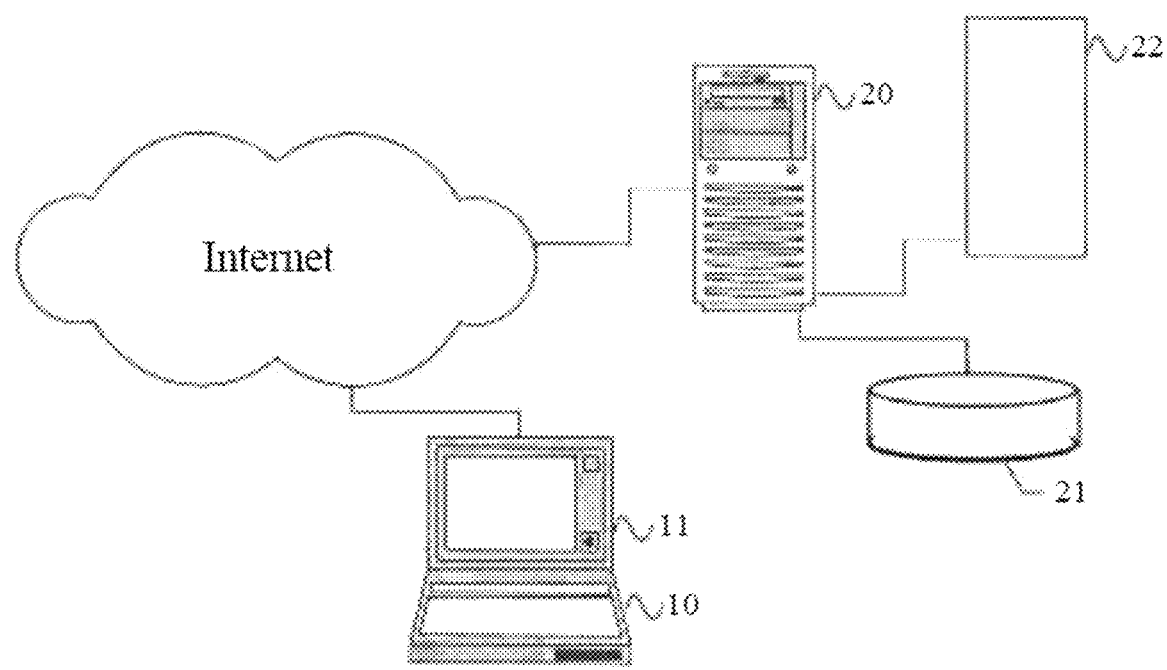
FIG. 5 illustrates an example of the overall configuration of a 3D GIS web service system according to the present disclosure.

FIG. 5 illustrates an example of the overall configuration of a 3D GIS web service according to the present disclosure, in which the web service uses a web client 10 and a server 20.

The web client 10 (e.g. a PC) cooperates with the server 20 and displays information transmitted from the server 20 on a screen 11 of the web client 10. When the web client 10 requests the server 20 for data about the interior of a specific 3D object (e.g. a building, a large facility such as a ship/plant, or any landmark) to be displayed on the screen 11, the server 20 searches the full set of corresponding 3D object data and extracts necessary data from it (e.g. which internal objects out of the 3D object should be displayed). Fortunately, using visibility index as well as spatial index according to the present disclosure, the server will now have a significantly narrowed range of targets to be searched and extracted, which in turn substantially reduces the run time of the server.

The server 20 herein refers to a means including both hardware and software, such as, a data storage 21 and an index processor 22, provided in the server 20.

Figure 6:
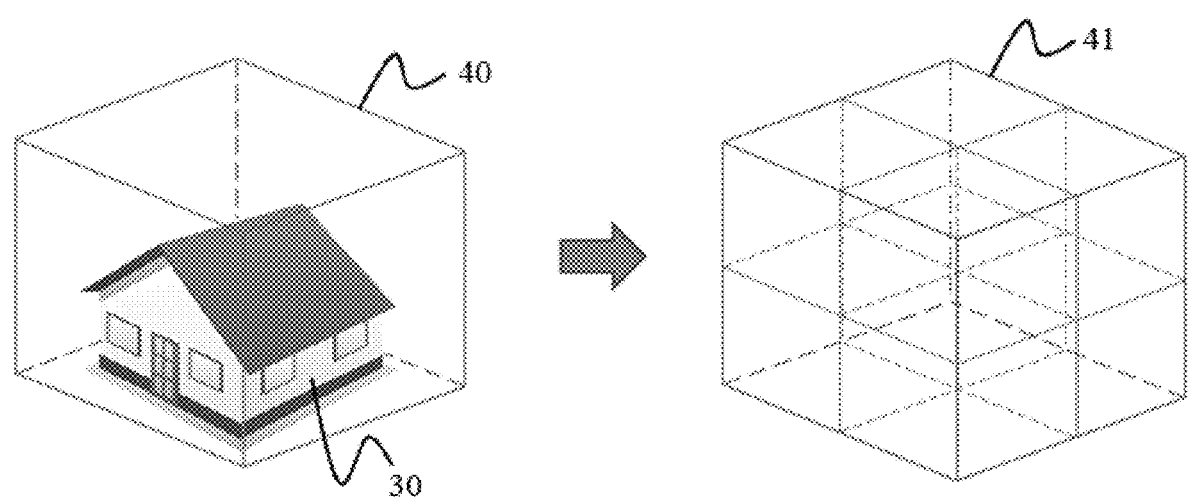

FIGS. 6 to 9 illustrate examples of a method for defining a visibility index according to the present disclosure. Referring first to FIG. 6, a first main cube 40 surrounding a specific 3D object (i.e., a building) 30 is set, and the first main cube 40 is split into 2n cubes along its length, width and height. The first main cube is then cut along a plane perpendicular to each surface, running across split points to obtain $8^n$ first sub-cubes 41. Each of the first sub-cubes 41 is designated as a space for extracting a visibility index. For example, if n=1, 8 it means that the first main cube is split into 8 first sub-cubes.

Figure 7:
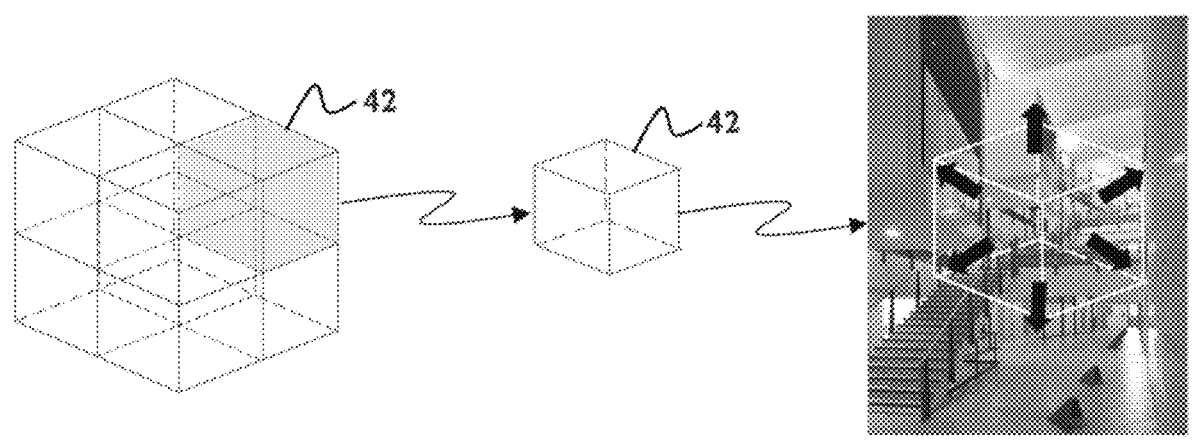

Referring next to FIG. 7, suppose that a camera is located at the core of the first sub-cube 41 (e.g. $C_{ijk}$, the i-th (length direction), j-th (width direction) and k-th (height direction), first sub-cube), and that the camera captures images outside the $C_{ijk}$ 42 in the directions (see the arrows) normal to six surfaces (east, west, south, north, top and bottom) that constitute the $C_{ijk}$ 42. Internal object IDs in the building seen on the screen are recorded as illustrated in FIG. 8. These become visibility indexes for $C_{ijk}$ 42 according to the present disclosure. For $C_{ijk}$ 42, internal objects having IDs 545 and 555 are visible through the bottom surface, for example. FIG. 8 illustrates an example of a method for extracting visibility indexes, with a camera being positioned at the core of a plurality of first sub-cubes. That is to say, in FIG. 8, visibility indexes for internal objects that are seen through the six surfaces of $C_{ijk}$ 42 are classified according to the surfaces seen from the camera. On the other hand, in FIG. 9, with a camera being positioned at the core of a plurality of first sub-cubes 41, $C_{ijk}$, $C_{i+1jk}$, $C_{i+jk}$, and so on, visibility indexes with respect to every surface direction of internal objects that are seen through the six surfaces of each, first sub-cube 41 are all listed, instead of classifying them according to the surfaces of each, first sub-cube 41 seen from the camera.

Figure 10:
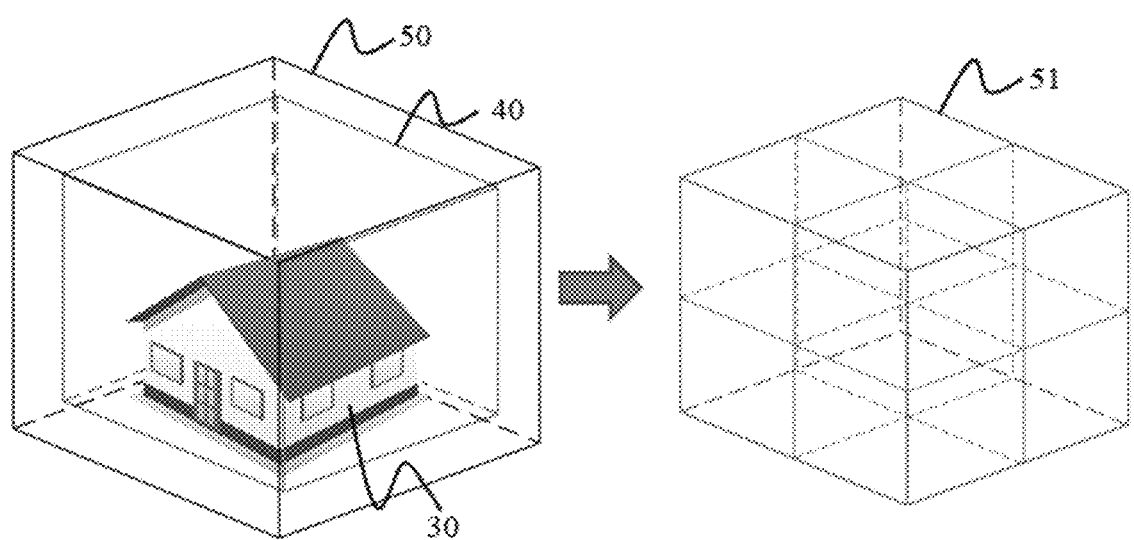

FIG. 10 and FIG. 11 illustrate examples of a method for defining a spatial index according to the present disclosure. First of all, a second main cube 50 surrounding a specific building 30 and having a different size from the first main cube 40 is set, and the second main cube 50 is split into 2n cubes along its length, width and height. The second main cube 50 is then cut along a plane perpendicular to each surface, running across split points to obtain $8^n$ second sub-cubes 51. Each of the second, sub-cubes 51 is designated as a space for extracting a spatial index. For example, if n=1, it means that the second main cube is split into 8 second sub-cubes. In these examples, the second main cube 50 and the second sub-cubes 51 are preferably set in the same manner as in the first main cube 40 and the first sub-cubes 41 described above. Spatial indexes are given to IDs of internal objects located within the second sub-cubes 51. In particular, FIG. 11 lists IDs of internal objects contained in the second sub-cubes 51, $O_{xyz}$, $O_{x+1yz}$, $O_{x+2yz}$ and so on, respectively, where $O_{xyz}$ denotes the the x-th (length direction), y-th (width direction) and z-th (height direction), second sub-cube. The second sub-cubes 51 have information about what building internal objects are found in what spatial zones.

Figure 12A:
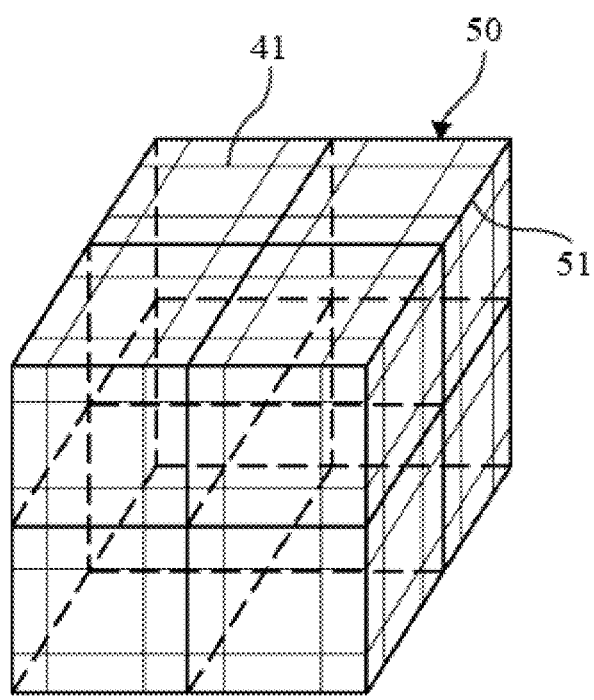
FIGS. 12A and 12B describe relationships between first main cube and second main cube, and between first sub-cube and second sub-cube.
Figure 12B:
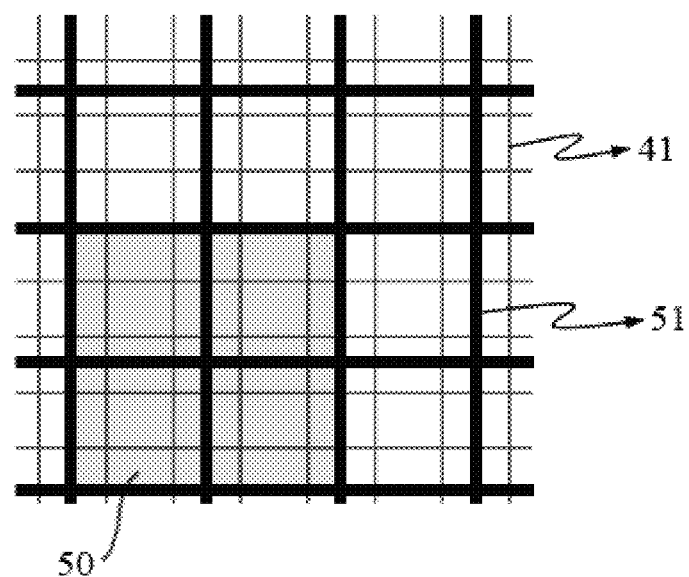

FIGS. 12A and 12B describe relationships between first main cube 40 and second main cube 50 and between first sub-cube 41 and second sub-cube 51.

In particular, relationships between the first sub-cube 41 for extracting visibility index and the second sub-cube 51 for extracting spatial index are depicted in FIG. 12. The second main cube 50 is preferably larger than the first main cube 40, and the second sub-cube 51 is also preferably larger than the first sub-cube 41. Because the first sub-cube 41 is primarily used to save internal objects that are visible from different positions of a camera, and visibility information is generated as the camera moves closely a very small amount each time, it is desirable that the first sub-cube 41 should be larger than the second sub-cube 51 which locationally divides the internal objects of a building. However, the first sub-cubes 41 are not limited thereto.

Figure 13A:
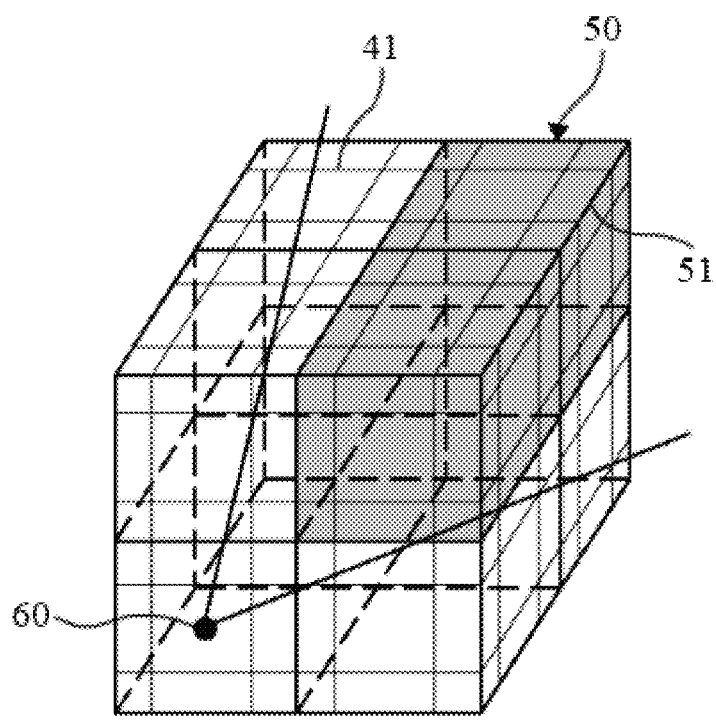

FIGS. 13A to 14 describe a method for providing a web service utilizing predefined visibility indexes and spatial indexes, according to the present disclosure.

Figure 13B:
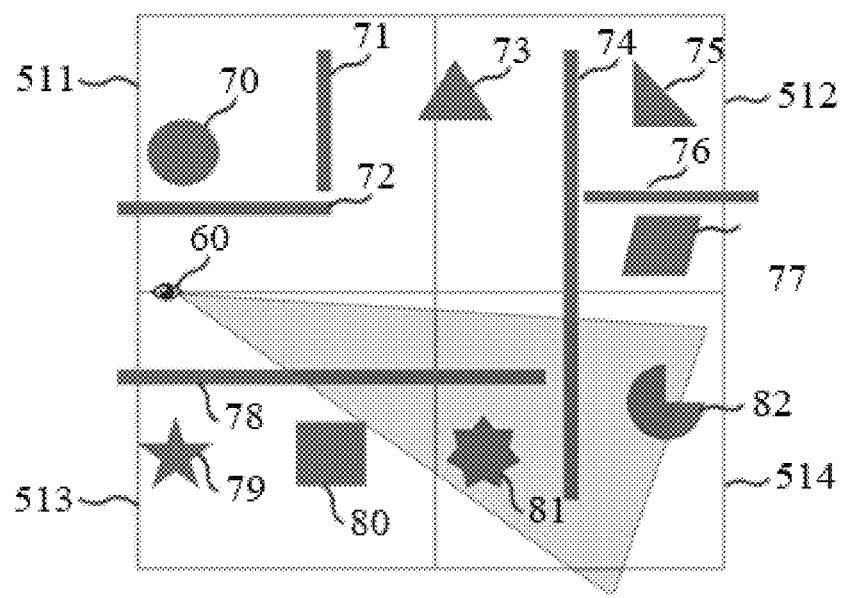
Figure 13C:
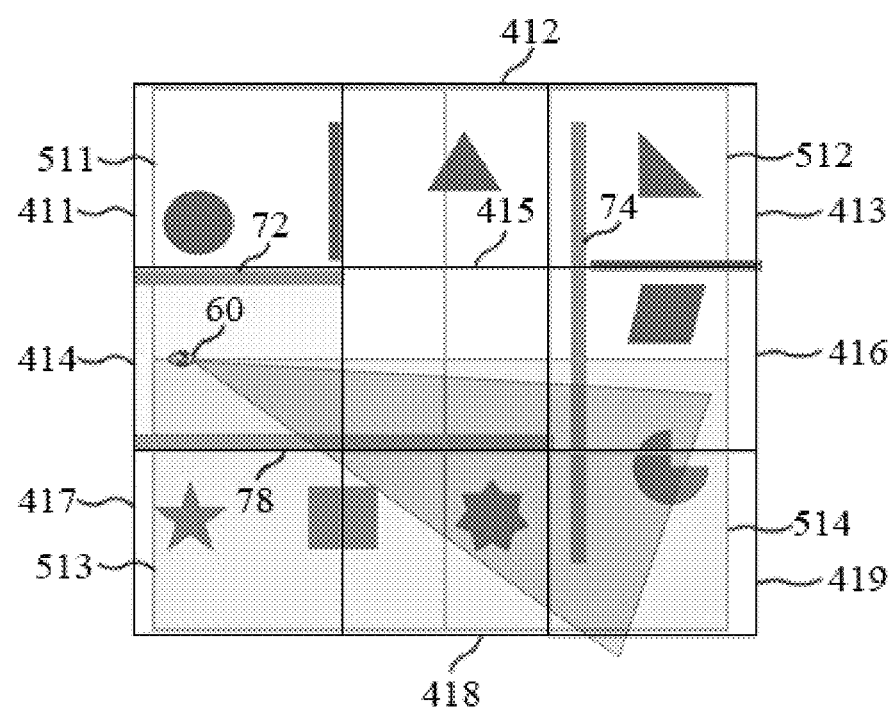
Figure 13D:
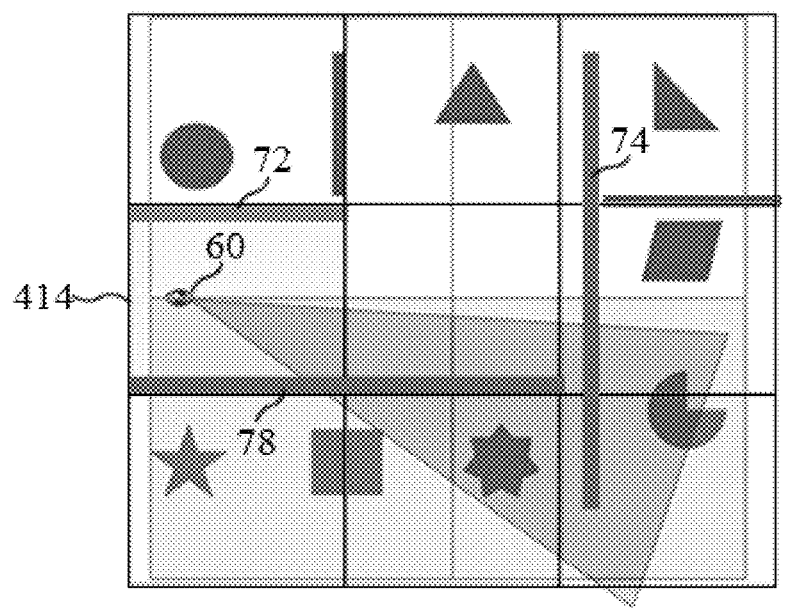

Referring first to FIG. 13A, once second sub-cubes 51 within the field of view of a camera 60 are determined based on the position and viewing direction of the camera 60, an internal candidate object group to be displayed on the screen is determined according to spatial indexes for the second sub-cubes 51 (Step 1). For a better understanding of this step, top views of FIG. 13A are provided in FIG. 13B, FIG. 13C and FIG. 13D. Internal objects 70, 71, 72, 73, 74, 75, 76, 77, 78, 79, 80, 81, 82 are also depicted in FIG. 13B, FIG. 13C and FIG. 13D to serve the same purpose. As can be seen in FIG. 13B, second sub-cubes 513, 514 out of multiple second sub-cubes 511, 512, 513, 514 are within the field of view of the camera 60. Then the internal objects 74, 78, 79, 80, 81, 82 corresponding to spatial indexes for the second sub-cubes 513, 514 become a candidate group to be displayed on the screen. Next, referring to 13C, first sub-cube 414 out of multiple first sub-cubes 411, 412, 413, 414, 415, 416, 417, 418, 419 is selected as it is where the camera 60 is positioned. The internal objects 72, 74, 78 are visible from the first sub-cube 414, and visibility indexes corresponding to the internal objects 72, 74, 78 are determined (Step 2). In FIG. 13D, among the visibility indexes corresponding to the internal objects 72, 74, 78 visible in the first sub-cube 414, visibility indexes corresponding to the internal objects 74, 78, which are overlapped with spatial indexes corresponding to the internal objects 74, 78, 79, 80, 81, 82 located inside the second sub-cubes 513, 514 are additionally selected (Step 3). Only the internal objects 74, 78 corresponding to the additionally selected, overlapped visibility indexes are displayed on the screen of a web client (Step 4). For the spatial indexes for the respective second sub-cubes, if, among those visibility indexes for the first sub-cubes, visibility indexes which are overlapped with the spatial indexes for the respective second sub-cubes are predefined as shown in FIG. 14, processing speed can be improved because these predefined indexes will be used in Step 2.

Figure 15:
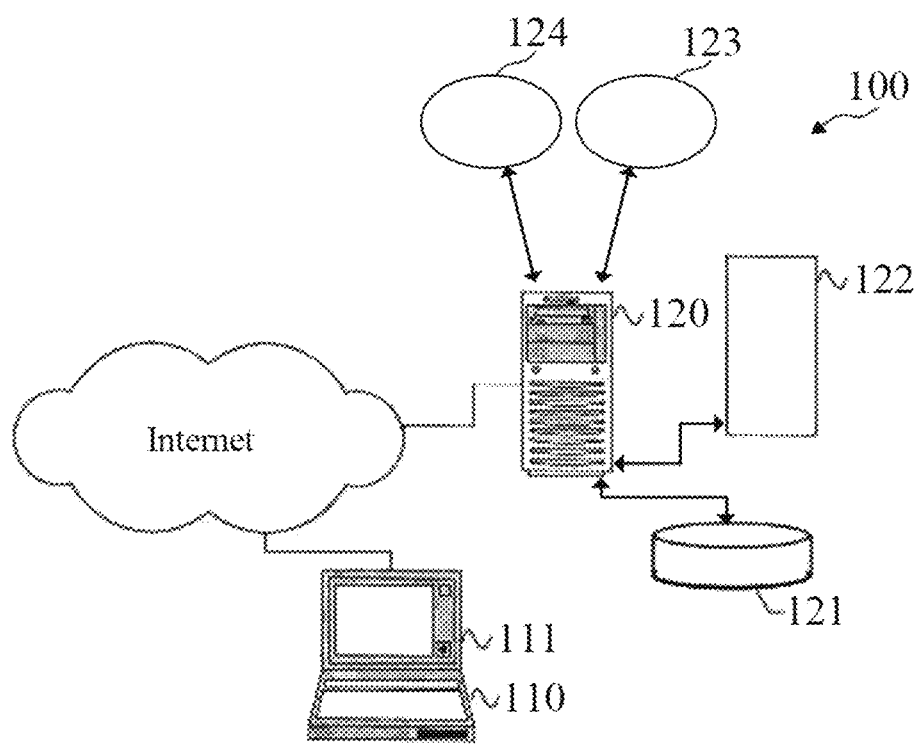
FIG. 15 illustrates an example of a 3D data web service system according to the present disclosure.

FIG. 15 illustrates an example of a 3D data web service system 100 according to the present disclosure.

In the 3D data web service system 100, a web client 110 (e.g. a PC) cooperates with a server 120 and displays information transmitted from the server 120 on a screen 111 of the web client 10. When the web client 110 requests the server 120 for 3D data about a 3D object (e.g. a building, a large facility such as a ship/plant, or any landmark) to be displayed on the screen 111, the server 120 transmits 3D data having an appropriate LOD according to the request to the web client 110 over the Internet.

The server 120 herein refers to a means including both hardware and software, such as, a data receiver 121, a data converter 122, an LOD generator 123 and a data storage 124, which are available in the server 120.

The data receiver 121 receives 3D data about a specific 3D object to be displayed on the screen of the web client 110.

The data converter 122 converts the received 3D data about a 3D object into lightweight triangular mesh data according to the methods of the present disclosure. More details will be provided with reference to FIGS. 16 to 18.

The LOD generator 123 generates triangular mesh data having different LODs using the lightweight triangular mesh data. More details will be provided with reference to FIGS. 19 to 21.

The data storage 124 stores triangular mesh data generated by the LOD generator 123, and if requested from the web client 110 it selects triangular mesh data that is used for constructing a triangular mesh model and has an appropriate LOD for the 3D object to be displayed on the screen 111 and then transmits the selected triangular mesh data to the web client 110. The data receiver 121, data converter 122, LOD generator 123 and data storage 124 available in the server 120 may proceed to make lightweight 3D data in real time for providing a web service for 3D objects to be displayed on the screen upon receiving a request from the web client 110. More preferably, for providing a web service faster, they can proceed to make lightweight 3D data and store it in the data storage 124 even before receiving a request.

FIGS. 16A to 16D describe an example of a method for converting 3D data about a 3D object into triangular mesh data, according to the present disclosure.

First, a 3D object model 200 is created using 3D data about a 3D object received by the data receiver 121. The created 3D object model 200 can be displayed on the screen. Rays are projected onto the 3D object model 200 and intersections 210 of a surface 201 of the 3D object model 200 and the rays are selected. More details will be provided with reference to FIG. 17. Next, a triangular mesh 220 is constructed using these intersections 210 of the surface 201 of the 3D object model 200 and the rays. One type of the 3D object model 200 is a triangular mesh model 221. That is to say, the triangular mesh model 221 refers to a triangular mesh form of the 3D object model 220.

Figure 17A:
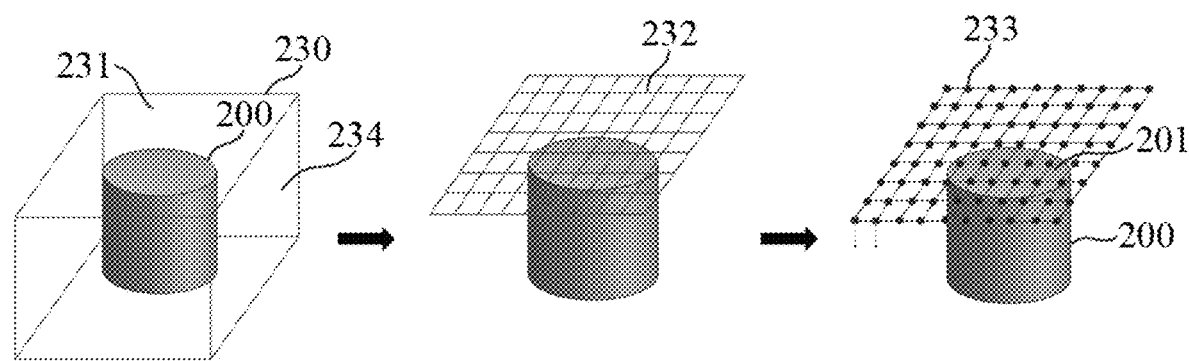
FIGS. 17A, 17B and 17C describe an example of a method for selecting intersections of the screen of a 3D object model and rays projected onto the 3D object model, according to the present disclosure.
Figure 17B:
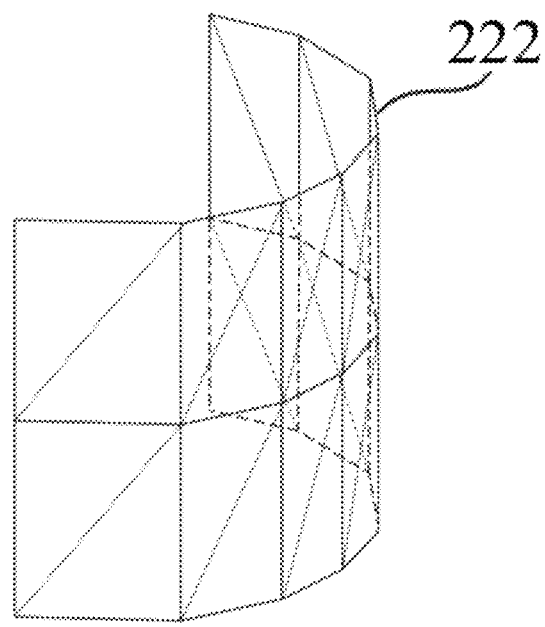
Figure 17C:
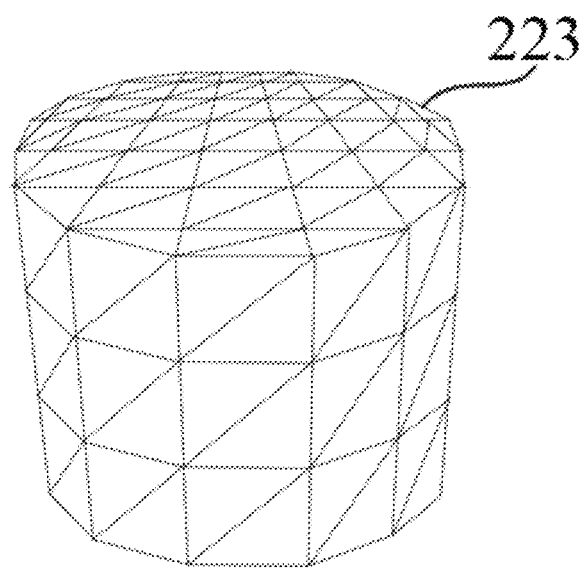

FIGS. 17A to 17C describe an example of a method for selecting intersections of the screen of a 3D object model 200 and rays projected onto the 3D object model 200, according to the present disclosure.

Figure 16A:
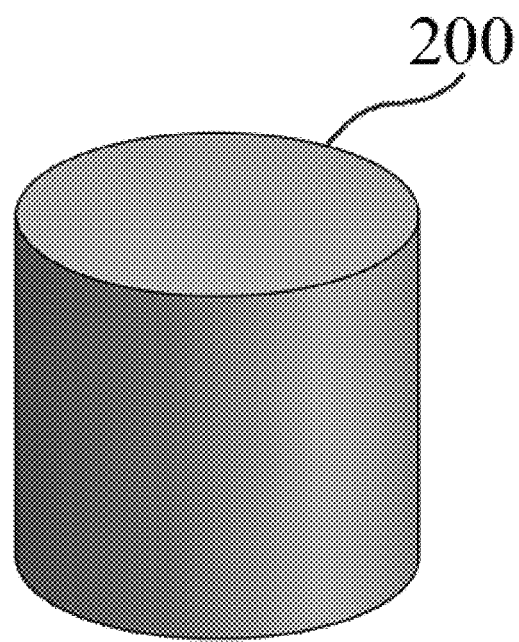
FIGS. 16A, 16B, 16C and 16D describe an example of a method for converting original 3D data about a 3D object into triangular mesh data, according to the present disclosure.
Figure 16B:
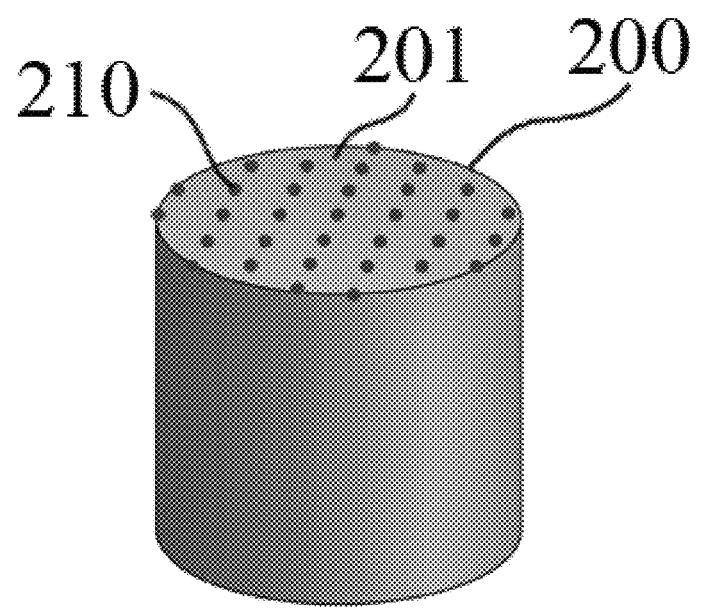
Figure 16C:
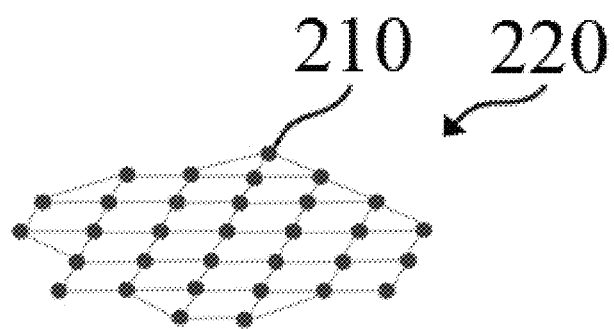
Figure 16D:
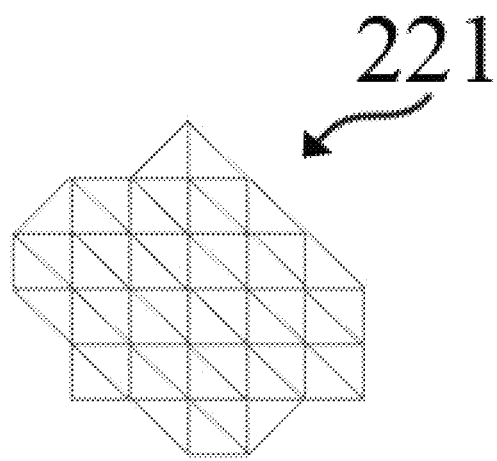

First, the 3D object model 200 is surrounded with a cuboid 230. Rays are projected towards the 3D object model in directions perpendicular to each surface of the cuboid. This is accomplished by dividing six surfaces of the cuboid into a grid structure at regular intervals. In FIG. 17A, top surface 231 out of the six surfaces of the cuboid 230 is divided into a grid structure 232 at regular intervals. Rays are projected in the perpendicular direction from each grid point 233 towards the 3D object model 200. Intersections 210 of the perpendicularly projected rays and the surface 201 of the 3D object model 200 are depicted in FIG. 16B. To facilitate better understanding, in FIG. 17, the 3D object model 200 being surrounded with the cuboid 230 is displayed on the screen, and the intersections 210 of perpendicularly projected rays and the surface 201 of the 3D object model 200 are marked for viewing. Alternatively, however, the intersections 210 of perpendicularly projected rays and the surface 201 of the 3D object model 200 can still be obtained without marking them on the screen. There are many other ways to do the same. For instance, it is possible to obtain the intersections 210 of perpendicularly projected rays and the surface 201 of the 3D object model 200 by graphic operations (e.g. off-screen rendering) using a graphic card. If 3D data is available, it is also possible to obtain the intersections 210 of perpendicularly projected rays and the surface 201 of the 3D object model 200 by simple linear algebra processing that solves solutions satisfying both plane and linear equations. If the LOD of the triangular mesh model 221 needs to be improved, a grid interval in the grid structure 232 can be reduced. The same process described above is carried out on a right side surface 234 of the cuboid 230 to obtain a triangular mesh model 22 as shown in FIG. 17B. Likewise, the same process described above is carried out on every surface of the cuboid 230, and a triangular mesh model 223 is obtained as a result as shown in FIG. 17C. In short, the 3D object model 200 is now transformed into the triangular mesh model 223 in FIG. 17C. These triangular mesh models 221, 222, 223 are converted into saved as data called 'triangular mesh data', which can be made lightweight. In short, a large volume of 3D data can be made into lightweight triangular mesh data.

FIGS. 18A to 18D describe another example of a method for selecting intersections of the screen of a 3D object model 300 and rays projected onto the 3D object model 300, according to the present disclosure.

Figure 18A:
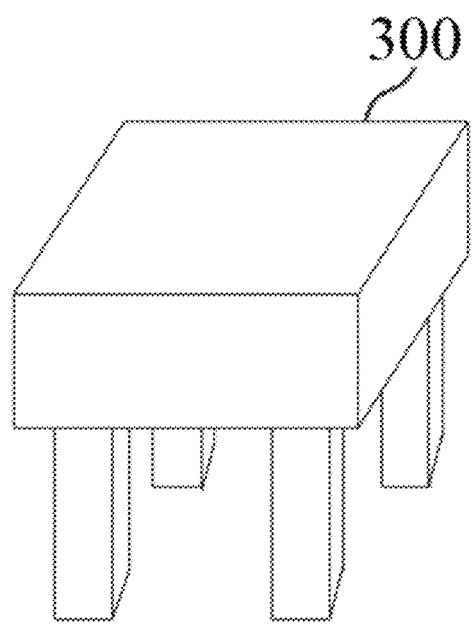
FIGS. 18A, 18B, 18C and 18D describe another example of a method for selecting intersections of the screen of a 3D object model and rays projected onto the 3D object model, according to the present disclosure.
Figure 18B:
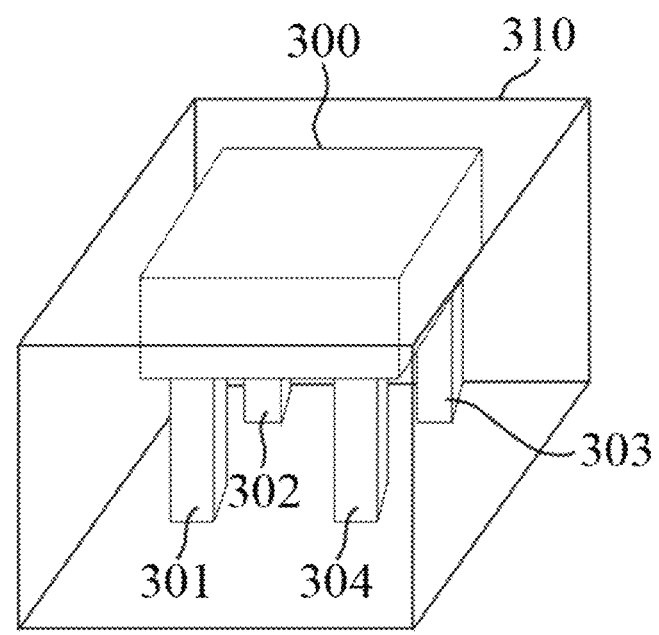
Figure 18C:
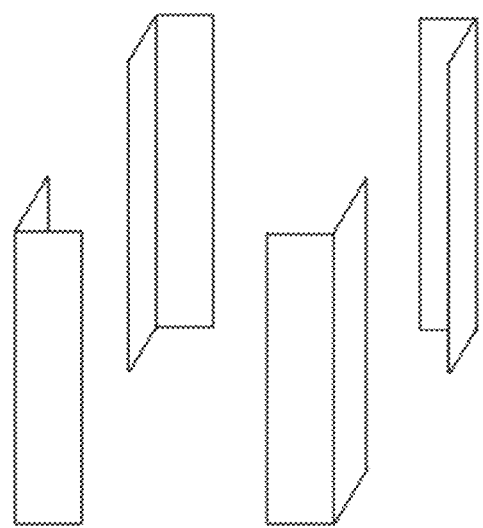

For inner surfaces of a void area within a structure, e.g. an indoor area of a building or empty space of a horizontal iron bar, the method described with reference to FIG. 17 is not useful because it cannot construct triangular meshes for those inner surfaces. For instance, if the 3D object model 300 has a table form and is surrounded with a cuboid 310 as shown in FIG. 18B, inner surfaces of four legs 301, 302, 303, 304 of the 3D object model 300 may not be visible from any surface of the cuboid 310 and therefore, cannot be represented by triangular meshes. That is, a triangular mesh model for those four legs 301, 302, 303, 304 will look like one shown in FIG. 18C. To avoid this problem, if a 3D object model that needs to be converted into triangular mesh data has hidden parts invisible from outside, the cuboid 310 surrounding the 3D object model 300 as depicted in FIG.

Figure 18D:
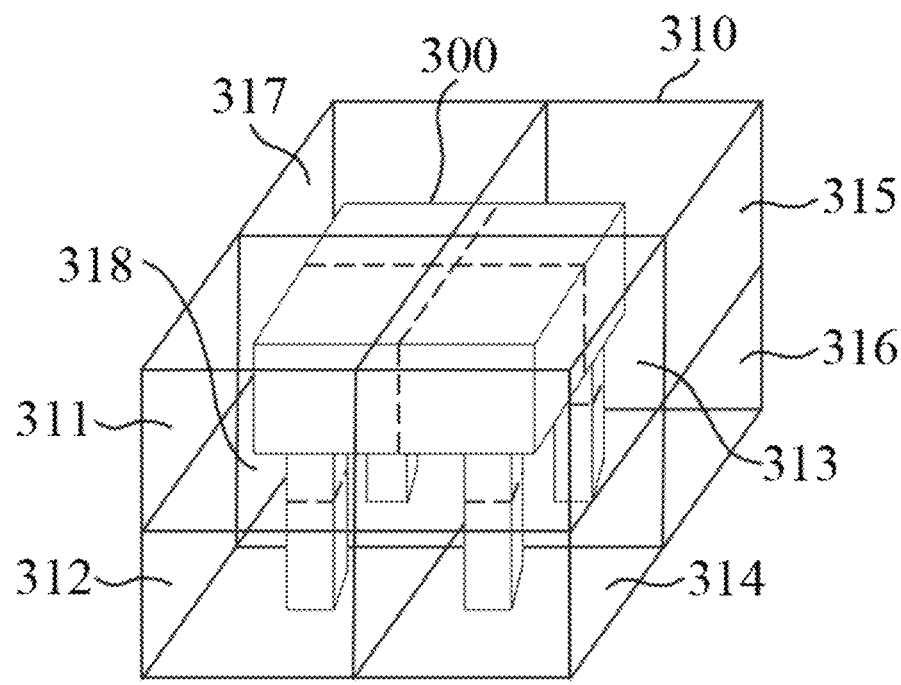

18D can be divided into 8 sub-cuboids 311, 312, 313, 314, 315, 316, 317, 318, and triangular mesh models for the sub-cuboids are obtained, respectively. These triangular mesh models thus obtained are combined together to create the 3D object model 300 and further a triangular mesh module, having a structure invisible from outside. While FIG. 18D illustrates 8 sub-cuboids, there can be more or less sub-cuboids as needed.

FIGS. 19A to 21C describe an example of a method for adjusting the LOD of a triangular mesh model that is created by lightweight triangular mesh data.

Figure 1:
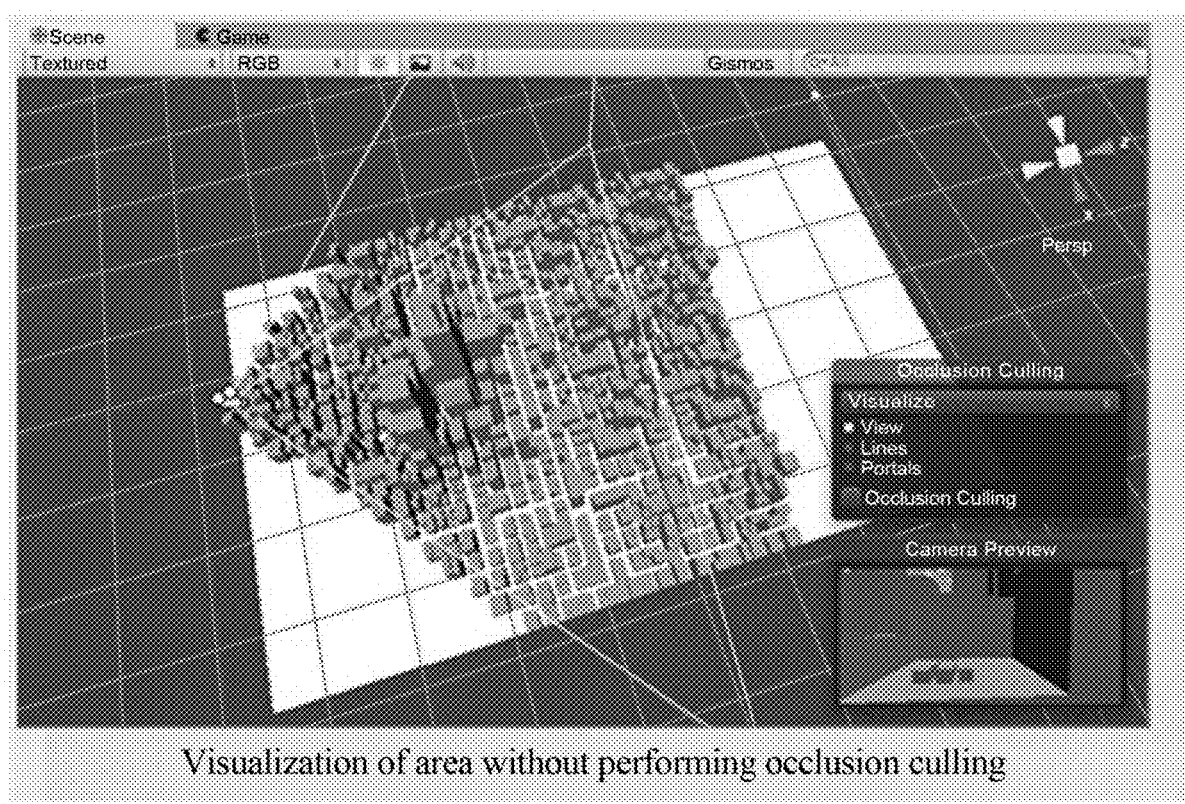
FIG. 1 illustrates an example of a screen visualized without performing occlusion culling on GIS data.
Figure 2:
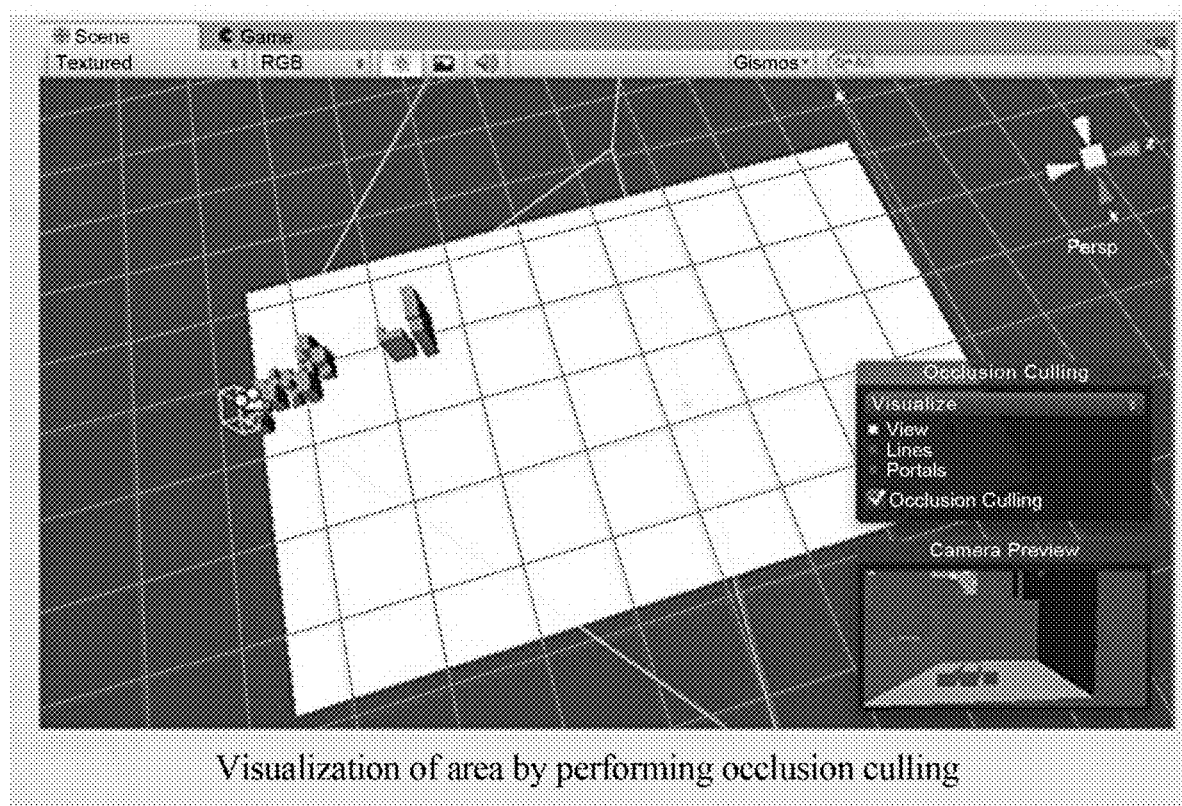
FIG. 2 illustrates an example of a screen visualized by performing occlusion culling on GIS data.
Figure 3:
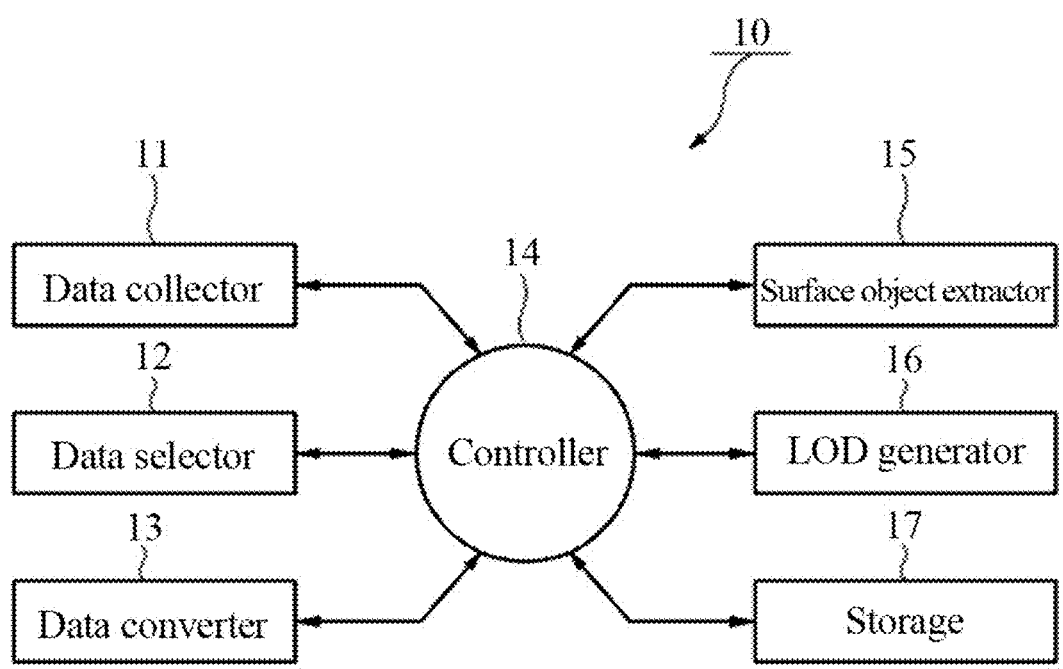
FIG. 3 illustrates an example of a system for processing 3D BIM data for use in GIS as described in Korean Patent Laid-Open Publication No. 1465483.
Figure 4A:
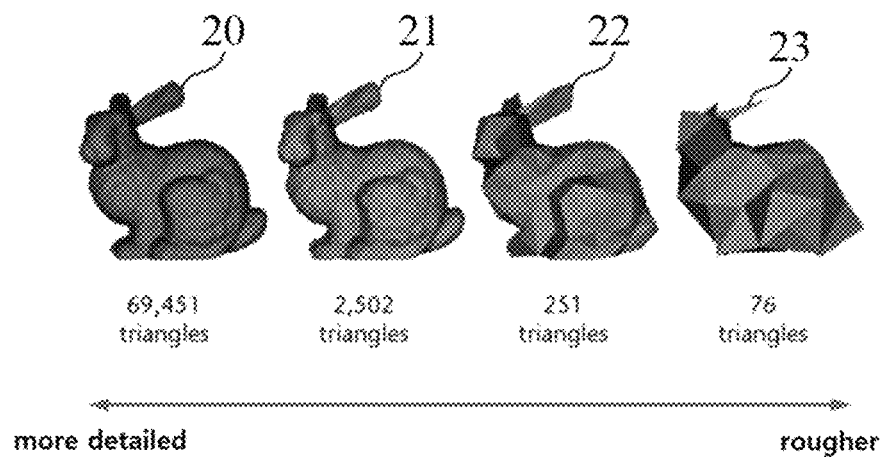
FIGS. 4A, 4B and 4C describe relationships between different LODs and triangular mesh data.
Figure 4B:
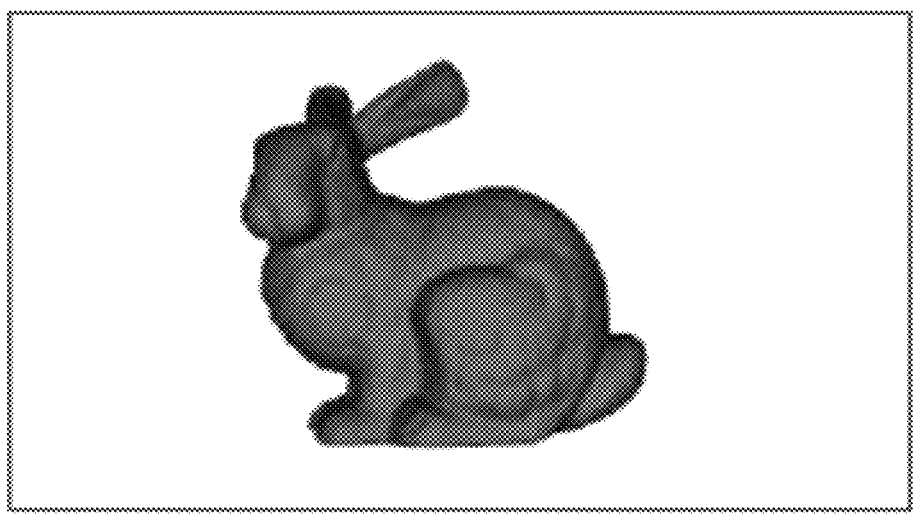
Figure 4C:
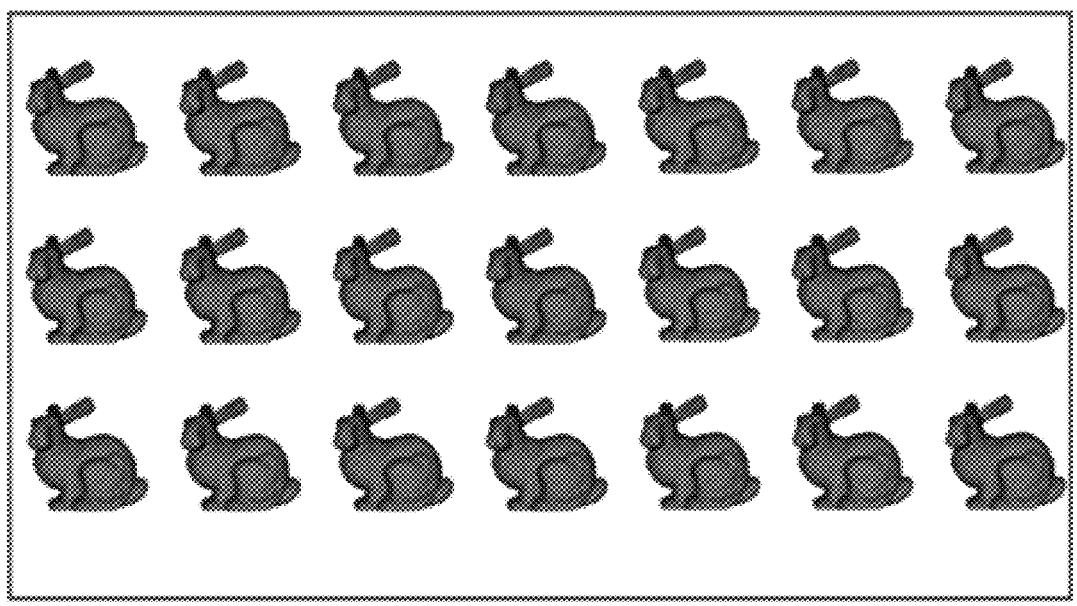

Adjustment of the LOD of a triangular mesh model created using triangular mesh data can be accompanied, as described with reference to FIG. 4, by increasing the number of triangles for use in a triangular mesh model if the LOD needs to be higher, or by decreasing the number of triangles for use in a triangular mesh model if the LOD needs to be lower. To obtain lightweight triangular mesh data, the present disclosure suggests that the number of triangles for use in a triangular mesh model should be reduced.

Figure 19A:
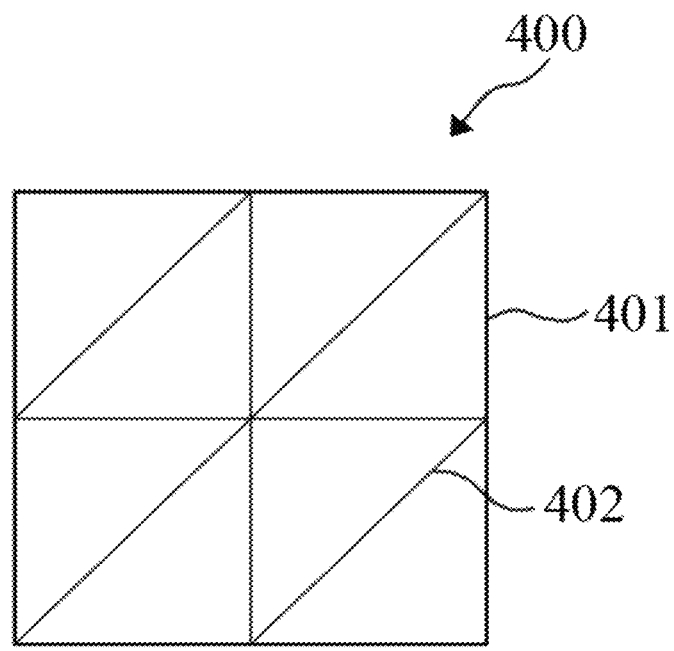
FIGS. 19A, 19B, 20A, 20B, 20C, 21A, 21B and 21C describe an example of a method for adjusting the LOD of a triangular mesh model that is generated by lightweight triangular mesh data.
Figure 19B:
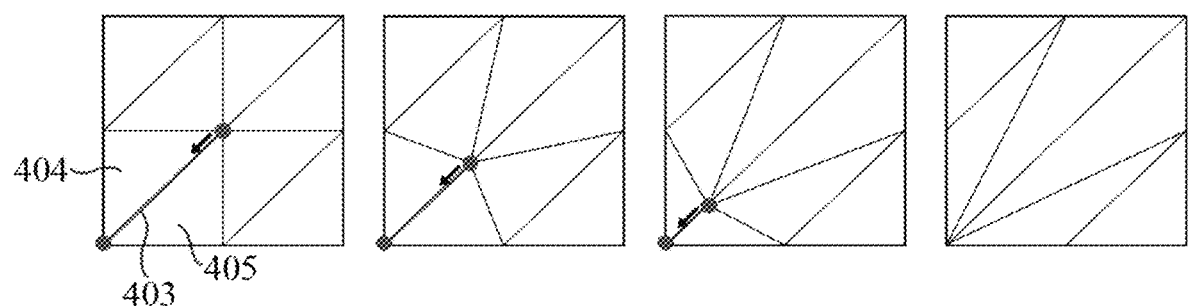

If there is a triangular mesh model 400 as shown in FIG. 19A, edges of triangles that form the triangular mesh model include frontier edges 401 and inner edges 402. The frontier edges are those on the edges or boundaries of the triangular mesh model 400, and the inner edges 402 are those inside the triangular mesh model 400. It is simple to distinguish between the frontier edges and the inner edges. For instance, if one triangle has a certain edge as its side, the edge is a frontier edge. If two triangles have the certain edge as their sides, the edge is an inner edge. In this disclosure, decreasing the number of triangles for use in a triangular mesh model is called an edge collapse operation. The edge collapse operation involves collapsing edges to collapse triangles. In the edge collapse operation, one endpoint at one side of an edge is shifted to an endpoint at the other side of the edge, making the length of the edge zero, i.e., geometrically eliminated. For instance, as illustrated in FIG. 19B, an edge 403 to be collapsed is shifted in the arrow direction, making the length of the edge 403 zero and collapsing the triangles 404, 405. A decision as to whether to lower the LOD through the edge collapse operation is dependent on whether the edge to be collapsed is a frontier edge or an inner edge. FIG. 20 describes a case where edges to be collapsed are inner edges, and FIG. 21 describes a case where edges to be collapsed are frontier edges.

Figure 20A:
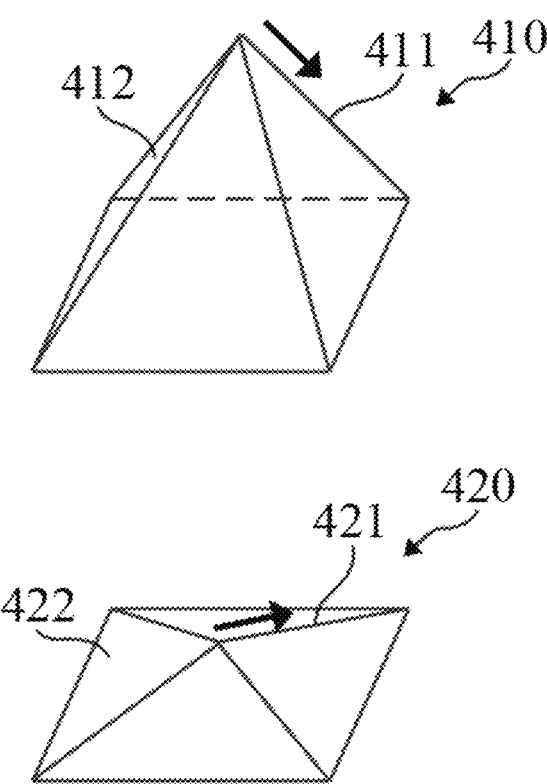
Figure 20B:
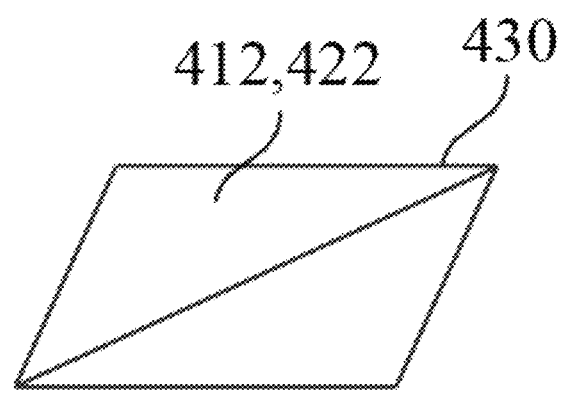
Figure 20C:
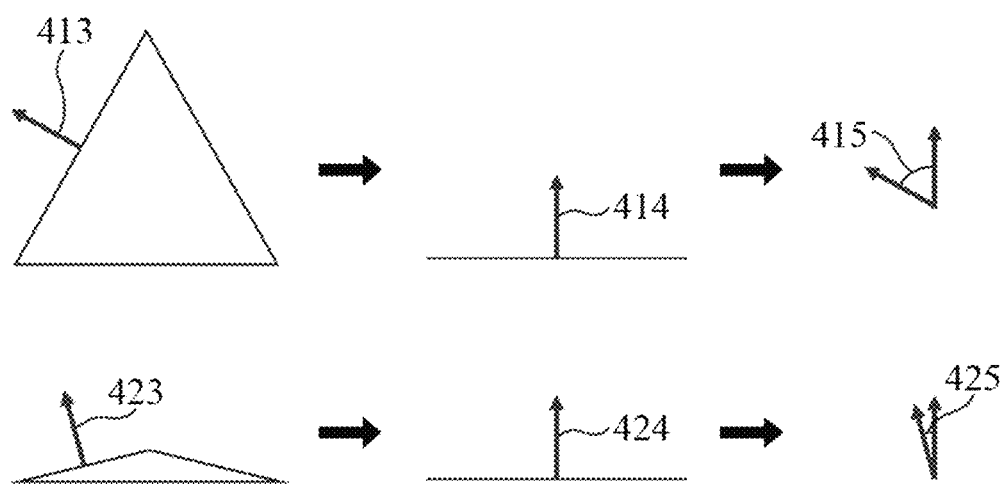

Referring to FIG. 20, if an inner edge is collapsed, it is determined whether a decrease in LOD is within an acceptable range, with respect to an angle between normal vectors for all of the triangles before and after transformation due to the collapsed edge. For instance, FIG. 20A shows two pyramid-shaped triangular mesh models 410, 420 having the same size base but different altitudes. If right side lateral edges 411, 421 of the triangular mesh models 410, 420 are collapsed in the arrow direction, a quadrilateral, triangular mesh model 430 composed of two identical triangles is obtained as shown in FIG. 20B. FIG. 20C shows an angle change in the normal vectors of triangles (lateral faces) 412, 422, as viewed from the front of the triangular mesh models 410, 420, during inner edge collapse operation on each of the two triangular mesh models 410, 420. In other words, it is possible to obtain an angle 415 between the normal vectors 413, 414 before and after transformation of the triangle 412 in the triangular mesh model 410 having a higher altitude. Similarly, it is also possible to obtain an angle 425 between the normal vectors 423, 424 before and after transformation of the triangle 422 in the triangular mesh model 420 having a lower altitude. By comparing the angles thus obtained with a reference value, it is determined whether a decrease in LOD of each triangular mesh model 410, 420 is within an acceptable range. The reference value used here for the comparison is predetermined, and may be set depending on user's recognition of the transformation. For instance, transformation exceeding a certain extent that the user can recognize it may not be acceptable. To explain further with the triangular mesh models 410, 420 having different altitudes as shown in FIG. 20, the inner edges 411 will not be collapsed if the angle 415 of the normal vectors before and after transformation of the triangular mesh model 410 having a higher altitude is above the reference value. On the other hand, the inner edges 421 will be collapsed if the angle 425 of the normal vectors before and after transformation of the triangular mesh model 420 having a lower altitude is below the reference value. In other words, the inner edges are collapsed and lightweight triangular mesh data can be obtained, only if a change is below the predetermined reference value. As such, if there are multiple predetermined reference values, triangular mesh data of different LODs can be generated.

To find out whether an inner edge is collapsible, one of the two endpoints of the inner edge can be selected and shifted, only if adjoining edges that are affected by shifting of the selected endpoint are all inner edges. If the two endpoints are shifted and only inner edges are affected in both cases, testing is conducted whether the inner edges are all collapsible in both cases.

Figure 21A:
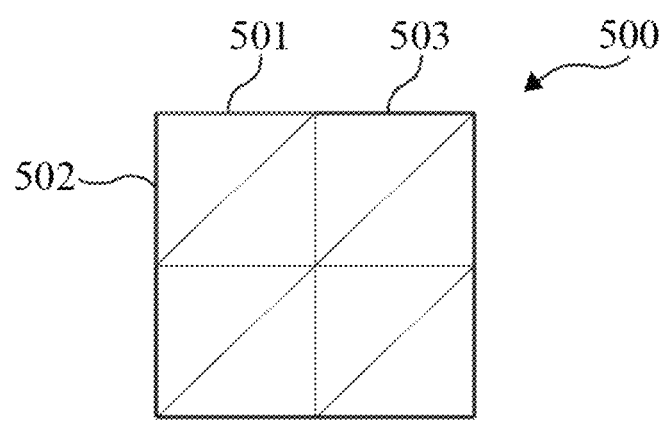
Figure 21B:
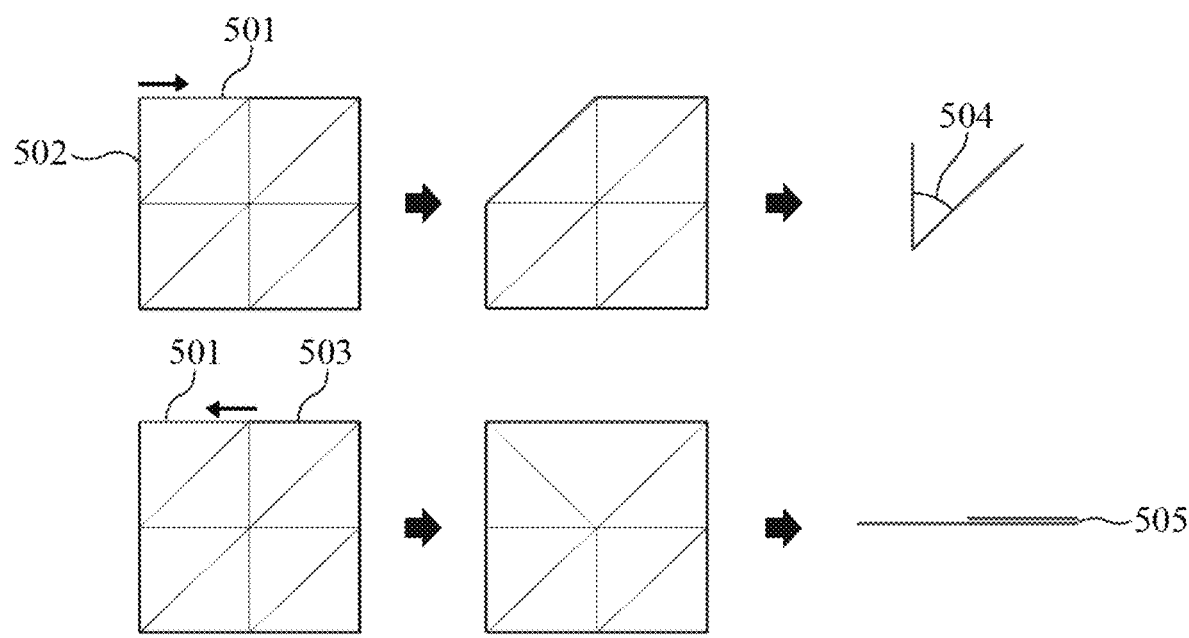
Figure 21C:
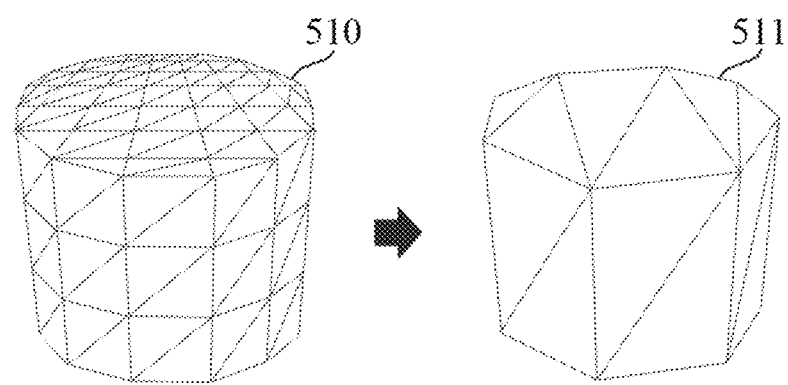

Referring now to FIG. 21, if a frontier edge is collapsed, an angle change before and after the collapse of adjoining frontier edges connected to the collapsed frontier edge is compared with a reference value, and it is determined whether a decrease in LOD is within the acceptable range. For instance, as both endpoints of a frontier edge 501 of a triangular mesh model 500 in FIG. 21A are always connected to other frontier edges 502, 503, if one frontier edge 501 is collapsed, one of the other adjoining frontier edges 502, 503 is always affected by the collapse operation. Therefore, an angle change before and after the collapse of the adjoining frontier edges 502, 503 affected by the collapse of the frontier edge 501 is compared with a reference value, and it is determined whether the collapse operation is applied. The reference value here can also be set depending on user's recognition of the transformation. As shown in FIG. 21B, when the frontier edge 501 is shifted in the arrow direction pointing right and collapsed, the adjoining frontier edge 502 affected by this collapse operation undergoes an angle change 504 that is above the reference value such that the edge collapse operation cannot be conducted. On the other hand, when the frontier edge 501 is shifted in the arrow direction pointing left and collapsed, the adjoining frontier edge 503 affected by this collapse operation undergoes an angle change 505 that is below the reference value such that the edge collapse operation can be conducted. FIG. 21C shows a triangular mesh model 510 being transformed into a lightweight triangular mesh model 511 by the edge collapse operation according to the present disclosure.

Figure 22:
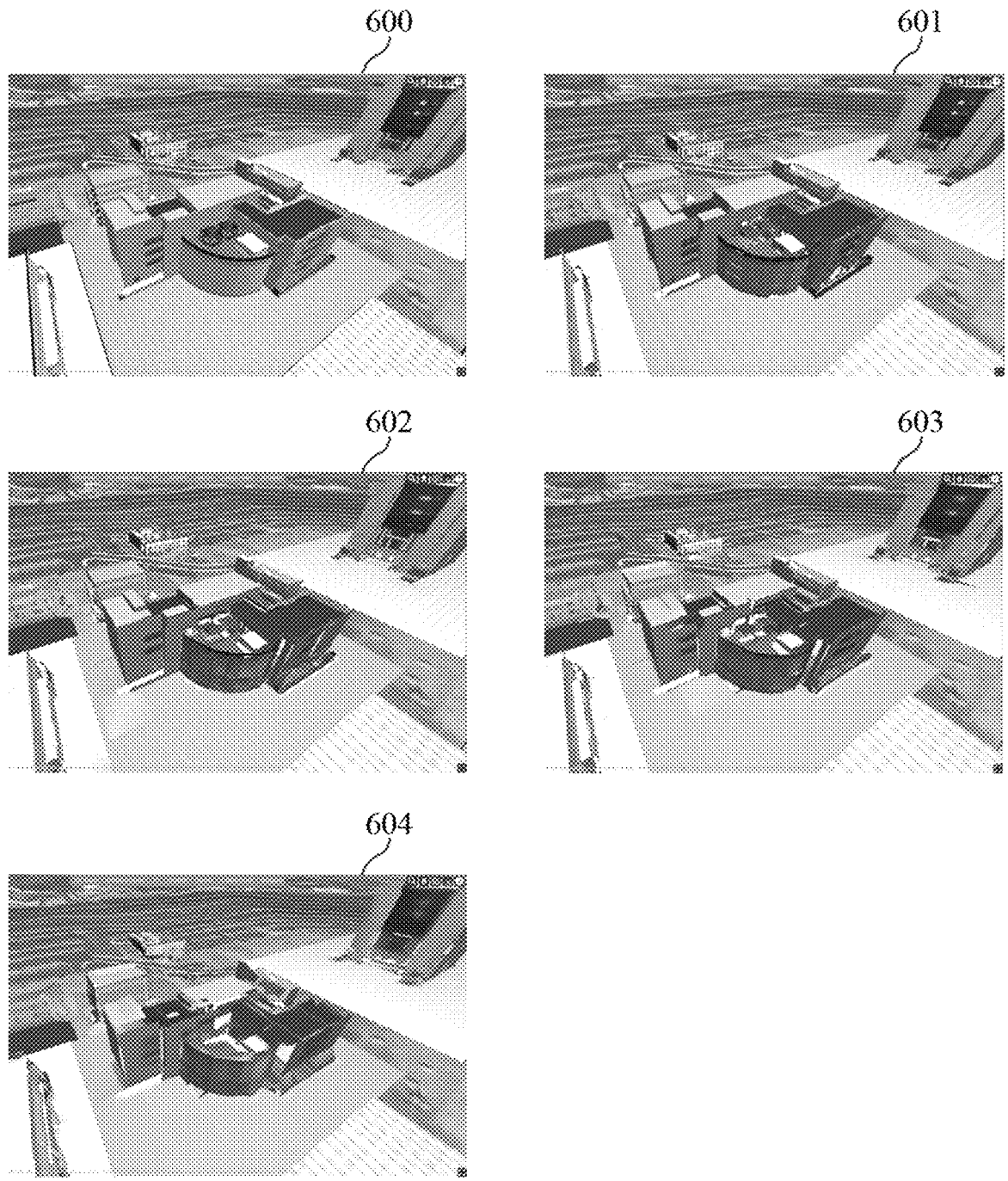
FIGS. 22 and 23 illustrate exemplary embodiments to which the present disclosure is applied.
Figure 23:
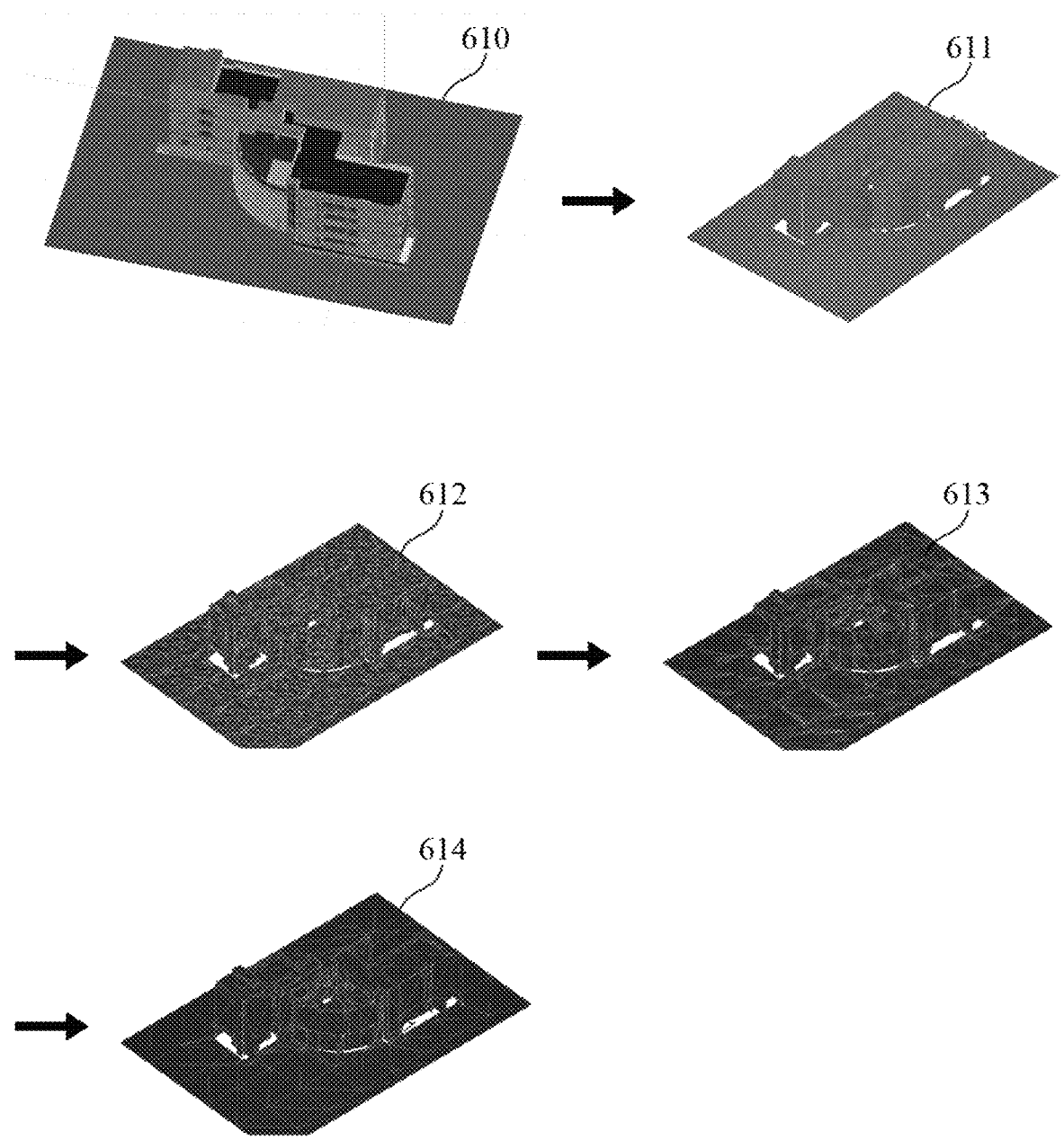

FIGS. 22 and 23 illustrate exemplary embodiments to which the present disclosure is applied.

In particular, a 3D object model 610 is constructed based on 3D data and made lightweight by using lightweight triangular mesh data. With LOD adjustment, triangular mesh models 611, 612, 613, 614 having different LODs are obtained as shown in FIG. 23, and a texture is applied thereto to obtain those models 600, 601, 602, 603, 604 as shown in FIG. 22. Here, the 3D object model 610 is a triangular mesh model composed of triangular meshes. In particular, it is a high-LOD (high-precision) triangular mesh model containing 410,346 triangular meshes. A grid structure is incorporated into this high-LOD triangular mesh model 610 to obtain a lightweight triangular mesh model 611. While a grid interval is set to 50 cm in this embodiment, it may vary as needed. Next, the edge collapse operation as well as multiple reference values can be applied to obtain those triangular mesh models 612, 613, 614 having different LODs. In this embodiment, for a lowest LOD, the reference value for the inner edge collapse operation is set to 20°, and the reference value for the frontier edge collapse operation is set to 5°, but these values can vary as needed. Moreover, a triangle mesh model 614 having the lowest LOD is composed of 5,252 triangles, being only 1.28% of the data size of the 3D object model 610.

Set out below are a series of clauses that disclose features of further exemplary embodiments of the present disclosure, which may be claimed.

(1) A method for providing 3D GIS (Geographic Information System) web services using a web client and a server, the method comprising the steps of: with the server, processing information to be transmitted to the web client; and with the server, transmitting, to the web client, information to be displayed on a screen of the web client in response to a request from the web client, wherein the information in the step of processing information includes information about a 3D object containing an internal object, the information about a 3D object having one or more first sub-cubes and one or more second sub-cubes set for the 3D object, with the first sub-cubes being used for processing visibility indexes and the second sub-cubes being used for processing spatial indexes, and wherein the step of transmitting information includes transmitting information about an internal object that corresponds to a visibility index overlapped with a spatial index.

(2) There is also provided, the method of clause (1) wherein: the visibility indexes are defined for the internal object with respect to all surfaces, instead of a particular surface, of the internal object as viewed from a camera positioned in each of the first sub-cubes.

(3) There is also provided, the method of clause (1) wherein: the spatial indexes are defined for an internal object located inside each of the second sub-cubes.

(4) There is also provided, the method of clause (1) wherein: the first sub-cubes forming a first main cube for the 3D object is obtained by splitting the first main cube into 2n cubes along the length, width and height to obtain 8n first sub-cubes by cutting the first main cube through a plane across split points.

(5) There is also provided, the method of clause (1) wherein: the first sub-cubes are smaller than the second sub-cubes.

(6) There is also provided, the method of clause (1) wherein: the request from the web client includes information about position and direction of the camera, and the server searches a second sub-cube based on the position and direction of the camera.

(7) There is also provided, the method of clause (6) wherein: the server searches a first sub-cube based on the position and direction of the camera.

(8) There is also provided, the method of clause (6) wherein: the step of processing information involves processing information about a visibility index for each of the first sub-cubes that is overlapped with a spatial index for each of the second sub-cubes.

(9) A method for processing 3D data for use in web services, the method comprising the steps of: receiving 3D data about a 3D object; making the 3D data about a 3D object into lightweight triangular mesh data; and adjusting LOD (Level of Detail) of a triangular mesh model created by the lightweight triangular mesh data, wherein the step of making the 3D data about a 3D object into lightweight triangular mesh data includes: creating a 3D object model using the received 3D data about the 3D object; projecting rays onto the created 3D object model to select intersections of the rays and surfaces of the 3D object model; and constructing a triangle mesh model using the intersections of the rays and surfaces of the 3D object model.

(10) There is also provided, the method of clause (9) wherein: the step of projecting rays onto the created 3D object model to select intersections of the rays and surfaces of the 3D object model involves surrounding the 3D object model with a cuboid, and projecting rays towards the 3D object model in directions perpendicular to each surface of the cuboid.

(11) There is also provided, the method of clause (10) wherein: after surrounding the 3D object model with a cuboid, each surface of the cuboid is divided into a grid structure at regular intervals, and the rays are projected from grid points towards the 3D object model.

(12) There is also provided, the method of clause (10) wherein: the cuboid surrounding the 3D object model is split into n sub-cuboids, and the rays are projected towards the 3D object model in directions perpendicular to each surface of a sub-cuboid.

(13) There is also provided, the method of clause (9) wherein: the step of adjusting LOD of a triangular mesh model created by the lightweight triangular mesh data includes: dividing edges of each triangle forming the triangle mesh model into frontier edges and inner edges; collapsing one or more edges among the frontier and inner edges for each triangle forming the triangle mesh model; and determining whether a decrease in LOD due to the collapsed edges is within an acceptable range.

(14) There is also provided, the method of clause (9) wherein: if an inner edge is collapsed, edges affected by the collapsed inner edge are all inner edges.

(15) There is also provided, the method of clause (13) wherein: if an inner edge is collapsed, determining whether a decrease in LOD due to the collapsed edge is within an acceptable range involves determining whether a decrease in LOD is within an acceptable range, with respect to an angle between normal vectors for all of the triangles before and after transformation due to the collapsed edge.

(16) There is also provided, the method of clause (13) wherein: if a frontier edge is collapsed, determining whether a decrease in LOD due to the collapsed edge is within an acceptable range involves determining whether a decrease in LOD is within the acceptable range, with respect to an angle change before and after the collapse of adjoining frontier edges connected to the collapsed frontier edge.

(17) A method for processing 3D data for use in web services, the method comprising the steps of: receiving 3D data about a 3D object; making the 3D data about a 3D object into lightweight triangular mesh data; and adjusting LOD (Level of Detail) of a triangular mesh model created by the lightweight triangular mesh data, wherein the step of adjusting LOD of a triangular mesh model created by the lightweight triangular mesh data includes: dividing edges of each triangle forming the triangle mesh model into frontier edges and inner edges; collapsing one or more edges among the frontier and inner edges for each triangle forming the triangle mesh model; and determining whether a decrease in LOD due to the collapsed edges is within an acceptable range.

(18) There is also provided, the method of clause (17) wherein: if an inner edge is collapsed, edges affected by the collapsed inner edge are all inner edges.

(19) There is also provided, the method of clause (17) wherein: if an inner edge is collapsed, determining whether a decrease in LOD due to the collapsed edge is within an acceptable range involves determining whether a decrease in LOD is within an acceptable range with respect to an angle between normal vectors for all of the triangles before and after transformation due to the collapsed edge.

According to the present disclosure, a 3D GIS web service with faster response can be provided.

Still, according to the present disclosure, a 3D GIS web service using both visibility and spatial indexes can be provided.

Still, according to the present disclosure, frustum culling followed by occlusion culling can be performed effectively.

Still, according to the present disclosure, it is possible to provide a web service with an increased processing speed of 3D data.

Still, according to the present disclosure, high-volume, high-LOD (high-precision) 3D data can easily be made lightweight.

What is claimed is:

1. A method for processing 3D data for use in web services, the method comprising the steps of:
   receiving 3D data about a 3D object;
   making the 3D data about the 3D object into lightweight triangular mesh data; and
   adjusting a Level of Detail (LOD) of a triangular mesh model created by the lightweight triangular mesh data,
   wherein the step of making the 3D data about the 3D object into lightweight triangular mesh data includes:
      creating a 3D object model using the received 3D data about the 3D object;
      projecting rays onto the created 3D object model to select intersections of rays and surfaces of the 3D object model; and
      constructing a triangle mesh model using the intersections of the rays and surfaces of the 3D object model;
   wherein the step of projecting rays onto the created 3D object model to select intersections of the rays and surfaces of the 3D object model includes surrounding the 3D object model with a cuboid, and projecting rays towards the 3D object model in directions perpendicular to each surface of the cuboid, and
   wherein the cuboid surrounding the 3D object model is split into n sub-cuboids, and the rays are projected towards the 3D object model in directions perpendicular to each surface of a sub-cuboid.

2. A method for processing 3D data for use in web services, the method comprising the steps of:
   receiving 3D data about a 3D object;
   making the 3D data about the 3D object into lightweight triangular mesh data; and
   adjusting a Level of Detail (LOD) of a triangular mesh model created by the lightweight triangular mesh data,
   wherein the step of making the 3D data about the 3D object into lightweight triangular mesh data includes:
      creating a 3D object model using the received 3D data about the 3D object;
      projecting rays onto the created 3D object model to select intersections of rays and surfaces of the 3D object model; and
      constructing a triangle mesh model using the intersections of the rays and surfaces of the 3D object model,
   wherein the step of adjusting LOD of the triangular mesh model created by the lightweight triangular mesh data includes:
      for each edge of each triangle forming the triangle mesh model, determining whether the edge is a frontier edge or an inner edge;
      collapsing one or more edges among the frontier and inner edges for each triangle forming the triangle mesh model; and
      determining, depending on whether the collapsed edges are frontier edges or inner edges, whether a decrease in LOD due to the collapsed edges is within an acceptable range,
   wherein an inner edge is only collapsed when all of the edges of the triangular mesh model affected by collapsing the inner edge are all inner edges.

3. A method for processing 3D data for use in web services, the method comprising the steps of:
   receiving 3D data about a 3D object;
   making the 3D data about the 3D object into lightweight triangular mesh data; and
   adjusting a Level of Detail (LOD) of a triangular mesh model created by the lightweight triangular mesh data,
   wherein the step of making the 3D data about the 3D object into lightweight triangular mesh data includes:
      creating a 3D object model using the received 3D data about the 3D object:
      projecting rays onto the created 3D object model to select intersections of rays and surfaces of the 3D object model; and
      constructing a triangle mesh model using the intersections of the rays and surfaces of the 3D object model,
   wherein the step of adjusting LOD of the triangular mesh model created by the lightweight triangular mesh data includes:
      for each edge of each triangle forming the triangle mesh model, determining whether the edge is a frontier edge or an inner edge;
      collapsing one or more edges among the frontier and inner edges for each triangle forming the triangle mesh model; and
      determining, depending on whether the collapsed edges are frontier edges or inner edges, whether a decrease in LOD due to the collapsed edges is within an acceptable range,
   wherein when an inner edge is collapsed, determining whether the decrease in LOD due to the collapsed edge is within the acceptable range includes determining whether the decrease in LOD is within the acceptable range with respect to an angle between a normal vector of each tringle before a transformation due to the collapsed edge and the normal vector of that triangle after the transformation due to the collapsed edge.

4. A method for processing 3D data for use in web services, the method comprising the steps of:
   receiving 3D data about a 3D object;
   making the 3D data about the 3D object into lightweight triangular mesh data; and
   adjusting a Level of Detail (LOD) of a triangular mesh model created by the lightweight triangular mesh data,
   wherein the step of making the 3D data about the 3D object into lightweight triangular mesh data includes:
      creating a 3D object model using the received 3D data about the 3D object;

projecting rays onto the created 3D object model to select intersections of rays and surfaces of the 3D object model; and constructing a triangle mesh model using the intersections of the rays and surfaces of the 3D object model, wherein the step of adjusting LOD of the triangular mesh model created by the lightweight triangular mesh data includes:

for each edge of each triangle forming the triangle mesh model, determining whether the edge is a frontier edge or an inner edge;

collapsing one or more edges among the frontier and inner edges for each triangle forming the triangle mesh model; and determining, depending on whether the collapsed edges are frontier edges or inner edges, whether a decrease in LOD due to the collapsed edges is within an acceptable range, wherein when a frontier edge is collapsed, determining whether the decrease in LOD due to the collapsed edge is within the acceptable range includes determining whether the decrease in LOD is within the acceptable range with respect to an angle between an adjoining frontier edge before the collapse of the frontier edge and the adjoining frontier edge after the collapse of the frontier edge.

* * * * *